US009135575B2

(12) United States Patent
Hurst et al.

(10) Patent No.: US 9,135,575 B2
(45) Date of Patent: Sep. 15, 2015

(54) SYSTEMS AND METHODS FOR ROUTING AND SCHEDULING VISITS TO DELIVERY LOCATIONS

(75) Inventors: Karl David Hurst, Baltimore, MD (US); Stephen Patrick Simon, Sparks, MD (US); Clifton Brian Kraisser, Ellicott City, MD (US)

(73) Assignee: ROADNET TECHNOLOGIES, INC., Baltimore, MD (US)

( * ) Notice: Subject to any disclaimer, the term of this patent is extended or adjusted under 35 U.S.C. 154(b) by 1783 days.

(21) Appl. No.: 11/382,405

(22) Filed: May 9, 2006

(65) Prior Publication Data
US 2006/0262967 A1 Nov. 23, 2006

Related U.S. Application Data

(60) Provisional application No. 60/679,428, filed on May 9, 2005.

(51) Int. Cl.
G06Q 30/00 (2012.01)
G06Q 10/00 (2012.01)
G06Q 10/04 (2012.01)
G06Q 10/08 (2012.01)
G06T 11/20 (2006.01)

(52) U.S. Cl.
CPC ............... *G06Q 10/00* (2013.01); *G06Q 10/04* (2013.01); *G06Q 10/047* (2013.01); *G06Q 10/08* (2013.01); *G06T 11/206* (2013.01)

(58) Field of Classification Search
CPC ..... G06Q 10/00; G06Q 10/04; G06Q 10/047; G06Q 10/08; G06T 11/206
USPC ............. 705/7.14, 15, 338; 382/128; 701/209
See application file for complete search history.

(56) References Cited

U.S. PATENT DOCUMENTS

| 4,350,970 | A | 9/1982 | Von Tomkewitsch |
| 5,168,451 | A | 12/1992 | Bolger |
| 5,265,006 | A | 11/1993 | Asthana et al. |
| 5,272,638 | A | 12/1993 | Martin et al. |
| 5,310,997 | A | 5/1994 | Roach et al. |
| 5,528,489 | A | 6/1996 | Asahara et al. |
| 5,541,848 | A | 7/1996 | McCormack et al. |
| 5,615,121 | A | 3/1997 | Babayev et al. |

(Continued)

FOREIGN PATENT DOCUMENTS

| CA | 2457533 | 8/2002 |
| CA | 2520212 | 4/2004 |

(Continued)

OTHER PUBLICATIONS

J. Bramel, D. Simchi-Levi, "The Capacitated VRP with Equal Demands" (The Logic of Logistics, 1997).*

(Continued)

*Primary Examiner* — Alan Miller
*Assistant Examiner* — Folashade Anderson
(74) *Attorney, Agent, or Firm* — Arent Fox LLP

(57) ABSTRACT

The present invention provides systems, methods and computer program-product for calculating and storing time and distance information in an economical and efficient manner. The time and distance information may be used in the development of traversable networks for the delivery and retrieval of items from multiple locations in a timely and efficient manner.

9 Claims, 23 Drawing Sheets

(56) References Cited

U.S. PATENT DOCUMENTS

| | | | |
|---|---|---|---|
| 5,616,899 A | 4/1997 | Recigno | |
| 5,692,125 A | 11/1997 | Schloss et al. | |
| 5,771,484 A | 6/1998 | Tognazzini | |
| 5,774,867 A | 6/1998 | Fitzpatrick et al. | |
| 5,809,479 A | 9/1998 | Martin et al. | |
| 5,848,395 A | 12/1998 | Edgar et al. | |
| 5,893,073 A | 4/1999 | Kasso et al. | |
| 5,920,846 A | 7/1999 | Storch et al. | |
| 5,922,040 A | 7/1999 | Prabhakaran | |
| 5,960,408 A | 9/1999 | Martin et al. | |
| 5,963,948 A * | 10/1999 | Shilcrat | 340/995.19 |
| 5,970,466 A | 10/1999 | Detjen et al. | |
| 6,010,239 A | 1/2000 | Hardgrave et al. | |
| 6,012,037 A | 1/2000 | Yoshikawa | |
| 6,029,140 A | 2/2000 | Martin et al. | |
| 6,035,278 A | 3/2000 | Mansour | |
| 6,047,260 A | 4/2000 | Levinson | |
| 6,064,976 A | 5/2000 | Tolopka | |
| 6,073,110 A | 6/2000 | Rhodes et al. | |
| 6,085,170 A | 7/2000 | Tsukuda | |
| 6,088,648 A | 7/2000 | Shah et al. | |
| 6,101,480 A | 8/2000 | Conmy et al. | |
| 6,150,961 A | 11/2000 | Alewine et al. | |
| 6,167,379 A | 12/2000 | Dean et al. | |
| 6,192,346 B1 | 2/2001 | Green | |
| 6,240,362 B1 | 5/2001 | Gaspard, II | |
| 6,263,358 B1 | 7/2001 | Lee et al. | |
| 6,285,951 B1 | 9/2001 | Gaskins et al. | |
| 6,317,058 B1 | 11/2001 | Lemelson et al. | |
| 6,317,686 B1 | 11/2001 | Ran | |
| 6,334,089 B2 | 12/2001 | Hessing | |
| 6,356,836 B1 * | 3/2002 | Adolph | 701/208 |
| 6,427,101 B1 | 7/2002 | Diaz et al. | |
| 6,493,427 B1 | 12/2002 | Kobylevsky et al. | |
| 6,496,774 B1 | 12/2002 | Davies | |
| 6,532,413 B1 | 3/2003 | Lee | |
| 6,532,414 B2 | 3/2003 | Mintz | |
| 6,587,786 B1 | 7/2003 | La Rue | |
| 6,615,130 B2 | 9/2003 | Myr | |
| 6,615,133 B2 | 9/2003 | Boies et al. | |
| 6,633,238 B2 | 10/2003 | Lemelson et al. | |
| 6,695,145 B2 | 2/2004 | Veau | |
| 6,701,299 B2 | 3/2004 | Kraisser et al. | |
| 6,741,926 B1 | 5/2004 | Zhao et al. | |
| 6,748,318 B1 | 6/2004 | Jones | |
| 6,813,555 B1 | 11/2004 | Kerner | |
| 6,871,184 B1 * | 3/2005 | Liberman | 705/15 |
| RE38,724 E | 4/2005 | Peterson | |
| 6,985,871 B2 | 1/2006 | Simon | |
| 7,139,721 B2 | 11/2006 | Borders et al. | |
| 7,222,081 B1 | 5/2007 | Sone | |
| 7,251,612 B1 | 7/2007 | Parker et al. | |
| 7,376,509 B2 * | 5/2008 | Endo et al. | 701/209 |
| 7,440,875 B2 * | 10/2008 | Cuthbert et al. | 703/2 |
| 7,860,738 B2 | 12/2010 | Simon | |
| 7,925,524 B2 | 4/2011 | Florence | |
| 2002/0077929 A1 | 6/2002 | Knorr et al. | |
| 2002/0095345 A1 | 7/2002 | Panelli et al. | |
| 2004/0039504 A1 | 2/2004 | Coffee et al. | |
| 2006/0136237 A1 * | 6/2006 | Spiegel et al. | 705/1 |
| 2008/0077464 A1 * | 3/2008 | Gottlieb et al. | 705/8 |
| 2009/0018760 A1 | 1/2009 | Heaps | |

FOREIGN PATENT DOCUMENTS

| | | |
|---|---|---|
| CA | 2605879 | 5/2006 |
| CN | 200680015869.7 | 5/2006 |
| EP | 0 845 747 | 6/1998 |
| EP | 1 043 860 | 10/2000 |
| EP | 1 221 666 | 7/2002 |
| EP | 02752778.7 | 8/2002 |
| EP | 04759594.7 | 4/2004 |
| EP | 06770107.8 | 5/2006 |
| GB | 2368426 | 5/2002 |
| JP | 05-101084 | 4/1993 |
| JP | 08-106493 | 4/1996 |
| JP | 08-123767 | 5/1996 |
| JP | 09-147041 | 6/1997 |
| JP | 09-198436 | 7/1997 |
| JP | 10-181815 | 7/1998 |
| JP | 00-20386 | 1/2000 |
| JP | 01-117997 | 4/2001 |
| JP | 01-331565 | 11/2001 |
| JP | 2002133318 | 5/2002 |
| WO | WO 99/46707 | 9/1999 |
| WO | WO 00/68859 | 11/2000 |
| WO | WO 01-69488 | 9/2001 |
| WO | WO 01/72109 | 10/2001 |
| WO | WO 02/19046 | 3/2002 |
| WO | WO 03/014883 | 2/2003 |
| WO | WO 2004/092995 | 10/2004 |
| WO | WO 2006/122070 | 11/2006 |

OTHER PUBLICATIONS

S. Anily, A. Federgruen "A Class of Eclidean Routing Problems with General Route Cost Functions," (Mathematics of Operations, 1990).*

AGN Novaes, OD Graciolli, "Designing Multi-Vehicle Delivery Tours in a Grid-Cell Format," (European Journal of Operational Research, 1999).*

Fracassini, Camillo, "Shopping Revolution Delivers The Goods", Scotsman, p. 22, Sep. 8, 1999.

Roadnet 5000 Operations Guide—Version 7.0, UPS Logistics Technologies, pp. 20,22,61,64,65,70,79,112, 192, 198, 305 and 306. Retrieved from the Internet: URL:http://web.archive.org/web/20030209222908/http://www.beveragesolutions.com/BSISupport/files/RoadNet_Operations_Guide.PDF>, retrieved by search authority on Aug. 11, 2004.

Hill A V et al: Modelling Intra-City Time-Development Travel Speeds for Vehicle Scheduling Problems, J. Oper. Res. Soc. (UK), Journal of the Operational Research Society, Apr. 1992, UK, vol. 43, No. 4, Apr. 1, 1992, pp. 343-351.

Yang-Byung Park et al: Vehicle Scheduling Problems With Time-Varying Speed, Computers & Industrial Engineering, Elsevier, UK, vol. 33, No. 3-4, Dec. 1997, pp. 853-856.

"E-Business in the New Beverage Marketplace." Beverage Marketing Corporation of New York, Sep. 2000.

"Consumers Continue to Select PETsMART.com as Their Internet Pet Site." PR Newswire, p. 6751, May 24, 2000.

"E-Grocer Update." The Food Institute Report, p. 1, Feb. 26, 2001.

PETsMART.com Web Site archived from May 11, 2000 through Aug. 16, 2000 on <URL: http://web.archive.org/web/http://www.petsmart.com>, retrieved on Mar. 30, 2004.

Timothy P. Henderson; "Scheduling Software Helps Webvan Meet 30-Minute Delivery Window", Jul. 2000, pp. 1-2; printed from www.stores.com.

The Descartes Systems Group, Inc.; "Descartes, The Global Leader in E-Fulfillment", Apr. 2000, pp. 1-2; printed from www.descartes.com.

The Descartes Systems Group, Inc.; "DeliveryNets, E-Business Solutions to Customer Fulfillment" pp. 1-2; printed from www.descartes.com around Jan. 2001.

The Descartes Systems Group, Inc.; "e-Frame, A Framework for Building DeliveryNets", p. 1-3; printed from www.decartes.com around Jan. 2001.

The Descartes Systems Group, Inc.; "e-Scheduler, Web-Based self-Scheduling for Delivery", pp. 1-3; printed from www.descartes.com around Jan. 2001.

Author Unknown; "In the Driver's Seat, Mobile Technology Improves Route Delivery Efficiency and Saves Big Bucks for Multi-Marques", Baking & Snack Magazine, Apr. 1998, pp. 1-2.

A. Breiner; "Mobile Accounting System Keeps Deliveries Fresh", Food Logistics, Apr. 15, 1999, p. 1.

The Descartes Systems Group, Inc.; "E-Fulfillment Solutions", Mar. 20, 2000; pp. 1-2 and pp. 1-4, printed from www.decartes.com/solutions/dnet home3.html and www.descartes.com/solutions/catalog.html.

(56) References Cited

OTHER PUBLICATIONS

Author Unknown; "Descartes Releases Customer-Centric: Web Scheduling Solution for Home Delivery and Consumer Direct Operations", Business Wire, Jan. 18, 2000, pp. 1-2, printed from http://quicken.excite.com/investments/news/story/bw . . . /a0322.htm &symbol=DSG.
P. Carter; "Computer Based Truck Dispatch Works Wonders in Hunter Valley", Australian Mining, Oct. 1990, pp. 42-46, vol. 82 (Australia).
P. Davis; "Airline Ties Profitability Yield to Management", SIAM News, May/Jun. 1994, pp. 1-6, vol. 27, No. 5; printed from http://www.siam.org/siamnews/mtc/mtc694.htm.
T. Baron; "One Vendor, One Solution—Businesses Turn to ERP to Help Simplify Their Supply Chains and Avoid Integration Hassles", Information Week, Nov. 8, 1999, p. 108.
Y. Hamaguchi, et al.; "Transportation Scheduling System Based on Evolution Algorithm and Super Parallel Computer", 'Steps Forward'. Second World Congress on Intelligent Transport Systems; Nov. 1995, pp. 2037-2030, vol. 4 (Yokohoma, Japan).
UPS Parcel Service Company, "User's Guide to ROADNET 5000, Routing and Scheduling System," Version 5.6, 1996, Roadnet Technologies, Inc., Timonium, Maryland.
UPS Logistics Group Company, "ROADNET 5000 Operations Guide," Version 6.02, 1997, Roadnet Technologies, Inc., Baltimore, Maryland.
"UPS Products," http://www.roadnet.com/products/default.html, one page, Oct. 15, 2003.
"Real-Time Delivery Management Provided," Refrigerated Transporter, May 1, 2001, p. 1, http://refridgeratedtrans.com/magazinearticle.asp?magazinearticleid=103659&magazineeid.
"Self-Select" Deliveries in Bar Code's UPS Package, e.logistics magazine, Jun./Jul. 2001, pp. 1-3, http://www.elogmag.com/magazine/12/ups.shtml.
UPS 2001 Press Releases, "UPS e-logistics Gives Power Boost to Back-End Fulfillment Solution," May 22, 2001, pp. 1-2, http://www.pressroom.ups.com/pressreleases/archives/archive/0,1363,3866,00.html.
UPS 2000 Press Releases, "On-Line Grocers Choose UPS's Roadnet Technologies for Complete Delivery Solution," Jan. 4, 2000, pp. 1-2, http://www.pressroom.ups.com/pressreleases/archives/archive/0,1363,3549,00.html.
International Search Report from corresponding PCT Application No. PCT/US02/25409 dated Aug. 8, 2002.
Airborne.com Launches Small Business Center. PR Newswire. Jun. 14, 2001, p. 1, see p. 1 of printout.
Kirkbride, Rob. Steady at the Wheel Parker President Grew Up in the Trucking Business. The Grand Rapids Press. Jan. 8, 2001, p. A4, see p. 2 of printout.
Rosencrance, Linda. Lycos, Yahoo Launch Web Voice Services. Computerworld. Oct. 23, 2000, vol. 34, No. 43, p. 60, see p. 2 of printout.
My Yellow Web Site Puts Customer in Driver's Seat. PR Newswire. Jun. 16, 2000, p. 1, see p. 1 of printout.
International Search Report from International Application No. PCT/US2004/012080 dated Sep. 7, 2004.
Canadian office action issued Nov. 6, 2009 in Canadian Patent Application No. 2,605,879, 2 pages.
Response to Canadian office action filed Mar. 10, 2010 in Canadian Patent Application No. 2,605,879, 18 pages.
Canadian office action issued Sep. 20, 2010 in Canadian Patent Application No. 2,605,879, 1 page.
Response to Canadian office action filed Nov. 23, 2010 in Canadian Patent Application No. 2,605,879, 5 pages.
1st Notification of Chinese office action issued Apr. 8, 2010 in Chinese Patent Application No. 200680015869.7, 9 pages.
$2^{nd}$ Notification of Chinese office action issued Aug. 27, 2010 in Chinese Patent Application No. 200680015869.7, 18 pages.
3rd Notification of Chinese office action issued Dec. 29, 2010 in Chinese Patent Application No. 200680015869.7, 6 pages.
$4^{th}$ Notificaton of Chinese offie acton issued May 31, 2011 in Chinese Patent Application No. 200680015869.7, 3 pages.
Canadian Office action issued Sep. 2, 2010 in Canadian Patent Application No. 2,520,212, 12 pages.
Canadian Office action issued Oct. 19, 2009 in Canadian Patent Application No. 2,457,533, 5 pages.
Response to Canadian Office action filed Apr. 14, 2010 in Canadian Patent Application No. 2,457,533, 21 pages.
European Office action issued Jan. 31, 2008 in European Patent Application No. 04759594.7, 5 pages.
Response to European Office action filed Jul. 30, 2008 in European Patent Application No. 04759594.7, 14 pages.
European Office action issued Jan. 11, 2011 in European Patent Application No. 02752778.7, 5 pages.
Response to European Office action filed Jun. 23, 2011 in European Patent Application No. 02752778.7, 3 pages.
International Search Report from International Application No. PCT/US2006/17813 dated Apr. 26, 2007.
International Preliminary Report on Patentability from International Application No. PCT/US06/17813 dated Jun. 11, 2008.
International Search Report for International Application No. PCT/US06/17813, Mailed April 26, 2007.
Response to Canadian Office action filed Jul. 15, 2011 in Canadian Patent Application No. 2,520,212, 25 pages.
Canadian Office Notice of Allowance issued Oct. 31, 2011 in Canadian Patent Application No. 2,605,879, 6 pages.
Canadian Office action issued Feb. 23, 2012 in Canadian Patent Application No. 2,457,533, 3 pages.
Stephen M. Waddams, The Law of Contracts Sixth Edition, Canadalawbook.ca, Jul. 2010, pp. 171-195.
Extended European Search Report from European Patent Application No. 06770107.8 dated Mar. 6, 2012.

\* cited by examiner

QUAD GRID PROCESSING AFTER 501 LOCATIONS

COMPLETE QUAD GRID DECOMPOSITION

ORDER OF LOCATION INPUT TO QUAD GRID PROCESSING

FRIEND SELECTION

FRIEND SELECTION WITH GEO-BALANCING

SUPER MATRIX

| | Lat, Long, Time, Distance | Lat, Long, Time, Distance | Lat, Long, Time, Distance | Lat, Long, Time, Distance | Lat, Long, Time, Distance | Lat, Long, Time, Distance | Lat, Long, Time, Distance | Lat, Long, Time, Distance | Lat, Long, Time, Distance | Lat, Long, Time, Distance |
|---|---|---|---|---|---|---|---|---|---|---|
| LOC #1 | 30180600, -81551600, 303, 3 | | | | | | | | | |
| LOC #2 | 30180200, -81551600, 332, 45 | 30182800, -81556200, 332, 45 | 30186000, -81571200, 423, 178 | 30196500, -81556200, 332, 45 | | | | | | |
| LOC #3 | 30180200, -81551600, 332, 45 | 30182800, -81556200, 331, 44 | 30186000, -81571200, 392, 132 | 30196500, -81556200, 439, 200 | | | | | | |
| LOC #4 | 30180200, -81551600, 303, 3 | 30180600, -81551600, 303, 3 | 30186000, -81571200, 423, 178 | 30196500, -81556200, 332, 45 | 30205300, -81551800, 145, 166 | | | | | |
| LOC #5 | 30180200, -81551600, 303, 3 | 30182800, -81556200, 332, 45 | 30180600, -81551600, 303, 3 | 30196500, -81556200, 332, 45 | 30205300, -81551800, 145, 166 | 30205500, -81551800, 464, 237 | 30206200, -81577000, 786, 432 | 30206300, -81551600, 469, 244 | 30206900, -81577400, 448, 214 | |
| LOC #6 | 30180200, -81551600, 303, 3 | 30180600, -81571200, 423, 178 | 30205300, -81551800, 145, 166 | 30206200, -81577000, 786, 432 | 30206900, -81577400, 448, 214 | | | | | |
| LOC #7 | 30180200, -81551600, 303, 3 | 30180600, -81551600, 303, 3 | 30182800, -81556200, 331, 44 | 30186000, -81571200, 423, 178 | 30205500, -81551800, 464, 237 | 30206300, -81551800, 469, 244 | | | | |
| LOC #8 | 30180200, -81551600, 303, 3 | 30180600, -81551600, 303, 3 | 30182800, -81556200, 331, 44 | 30186000, -81571200, 423, 178 | 30205300, -81551800, 145, 166 | 30206200, -81577000, 786, 432 | 30206300, -81551800, 469, 244 | | | |
| LOC #9 | 30186000, -81571200, 423, 178 | 30196500, -81556200, 332, 45 | 30182800, -81556200, 332, 45 | 30206300, -81551800, 469, 244 | 30206900, -81577400, 448, 214 | | | | | |
| LOC #10 | 30186000, -81571200, 423, 178 | 30196500, -81556200, 332, 45 | 30205300, -81551800, 145, 166 | 30206200, -81577000, 785, 432 | 30205500, -81551800, 464, 237 | 30206900, -81577400, 448, 214 | | | | |

Latitude (millionths degrees)
Longitude (millionths degrees)
Time (secs)
Distance (100ths miles)

FIG. 21

DROPOFF HANDLING

SYSTEMS AND METHODS FOR ROUTING AND SCHEDULING VISITS TO DELIVERY LOCATIONS

CROSS-REFERENCE TO RELATED APPLICATIONS

This application claims the benefit of U.S. Provisional Application No. 60/679,428, filed May 9, 2005, which is incorporated by reference herein in its entirety.

BACKGROUND OF THE INVENTION

When routing delivery vehicles between a large number of delivery locations, current routing and scheduling systems often utilize stored time and distance data in conjunction with routing and scheduling algorithms to create routes. Calculating the shortest path between each location within a delivery region is often an expensive and time consuming process, with the task becoming exceedingly more difficult as the delivery area expands. In fact, performing shortest path calculations between a large number of delivery locations or over an extended area of land is often beyond the processing and memory capabilities of some computers. For those computers that do possess the capacity to perform such calculations, the process is still entails a time consuming process. Accordingly, improved logistics systems are needed that calculate and store time and distance data in a more economical and efficient format.

BRIEF SUMMARY OF THE INVENTION

Embodiments of the present invention provide a system, method and computer program product for calculating and storing time and distance information in an economical and efficient manner.

One aspect of the invention is a computer program product for controlling a computing device having at least a memory, a processor and a display device. The computer program product is for calculating and storing shortest path information between two or more delivery locations, and comprises a computer-readable storage medium that stores computer-readable program code portions. The computer-readable program code portions include a grid partitioning module that divides an overall delivery region into multiples of a defined number of grids. For example, the grid partitioning module may be a quad grid partitioning module that divides the delivery region into a number of grids that is a multiple of four. Two or more delivery locations are located within at least one of the defined number of grids. Another program code portion is an initial friend selection module that selects one of the defined number of grids and for each particular delivery location within the selected grid a friends list is created that is comprised of a set of delivery locations that are most likely to appear on the same route as the particular delivery location. The computer program product also includes a super matrix creation module that creates a traversable network comprised of nodes and arcs for the selected grid, calculates time/distance data from each delivery location within the selected grid to every node within the traversable network, and populates a super matrix containing time/distance data from each particular delivery location within the selected grid to each delivery location in that location's friends list and any in-range depots.

Another aspect of the present invention is a system for delivering items to two or more delivery locations. The system is comprised of a delivery vehicle capable of transporting one or more items for delivery at each of said two or more delivery locations. The delivery items are obtained at a depot. The system further includes the computer program product described above. The delivery vehicle utilizes said shortest path information determined by the computer program product to determine a route for obtaining the one or more items for delivery at each of the two or more delivery locations and transporting the one or more items for delivery at each of the two or more delivery locations to each delivery location.

Yet another aspect of the present invention is a computer system for calculating and storing shortest path information between two or more potential delivery locations. The computer system comprises at least a processor that is configured to partition a delivery region into multiples of one or more discrete geographic areas, and each of the geographic areas includes a first set of one or more potential delivery locations. The processor is configured to select a first geographic area and creates a unique second set of potential delivery locations for each potential delivery location geographically located within the first geographic area. The processor is also configured to create a traversable network. The traversable network comprises a set of nodes and arcs and further includes a set of two or more nodes comprising at least the potential delivery locations geographically located within the first geographic area and all potential delivery locations included within any of the unique second sets of potential delivery locations created above. The processor is configured to calculate shortest path information from each of the potential delivery locations geographically located within the first geographic area to every node contained within the traversable network and select particular shortest path information and store the particular shortest path information for future lookup by a routing and scheduling system.

Another aspect of the present invention is a computer system for calculating and storing shortest path information between two or more potential delivery locations. The computer system is comprised of at least a processor that is configured to create a unique set of potential delivery locations for each potential delivery location geographically located within a geographic area. The processor is also configured to create a traversable network uniquely associated with the geographic area. The traversable network comprises a set of nodes and arcs and further includes a set of two or more nodes comprising at least the potential delivery locations geographically located within the geographic area and all potential delivery locations included within the unique set of potential delivery locations created above. The processor is configured to calculate shortest path information from each of the potential delivery locations geographically located within the geographic area to every node contained within the traversable network, and select particular shortest path information and store the selected particular shortest path information for future lookup by a routing and scheduling system.

Another aspect of the present invention is a method for calculating and storing shortest path information between two or more potential delivery locations. This method comprises the steps of partitioning a delivery region into multiples of one or more discrete geographic areas. Each of the geographic areas includes a first set of one or more potential delivery locations. Another step is selecting a first geographic area and creating a corresponding unique second set of potential delivery locations for each potential delivery location geographically located within the selected geographic area. A traversable network is created that comprises a set of nodes and arcs and further includes a set of two or more nodes comprising at least the potential delivery location geographically located within the selected geographic area and all potential delivery locations included within the unique second set of potential delivery locations that correspond to the potential delivery locations geographically located within the selected geographic area. Shortest path information from the delivery location geographically located within the selected geographic area to every node contained within the traversable network is calculated and stored. The above steps are repeated as necessary for each potential delivery location geographically located within the selected geographic area, and for every geographic area created above.

These and other aspects of the present invention are described more fully herein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 17:
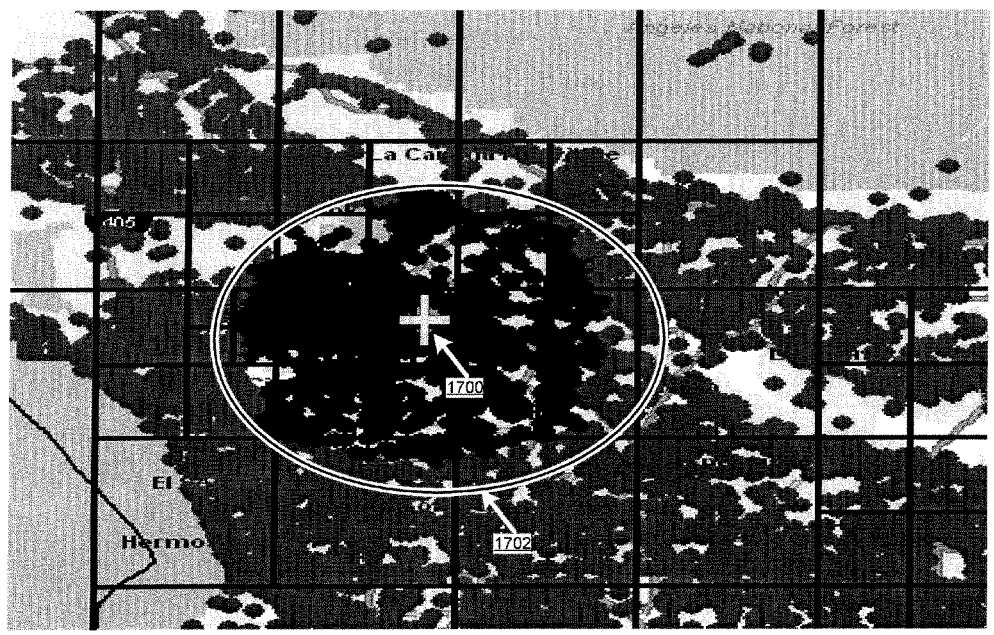
Figure 18:
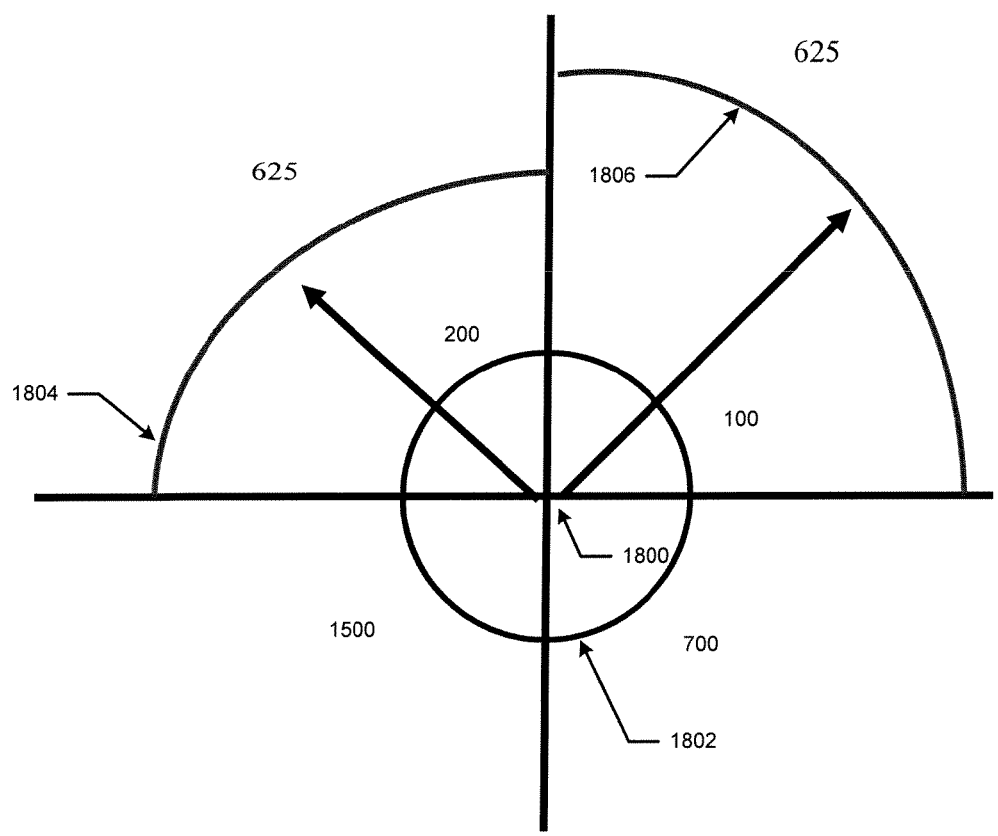
Figure 19:
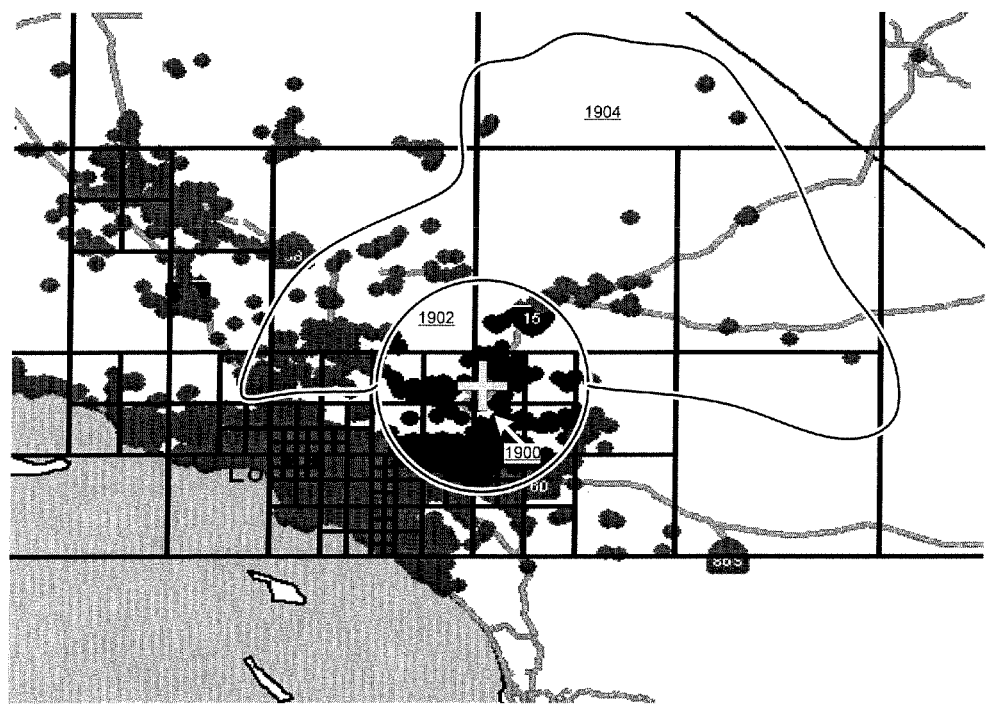
Figure 20:
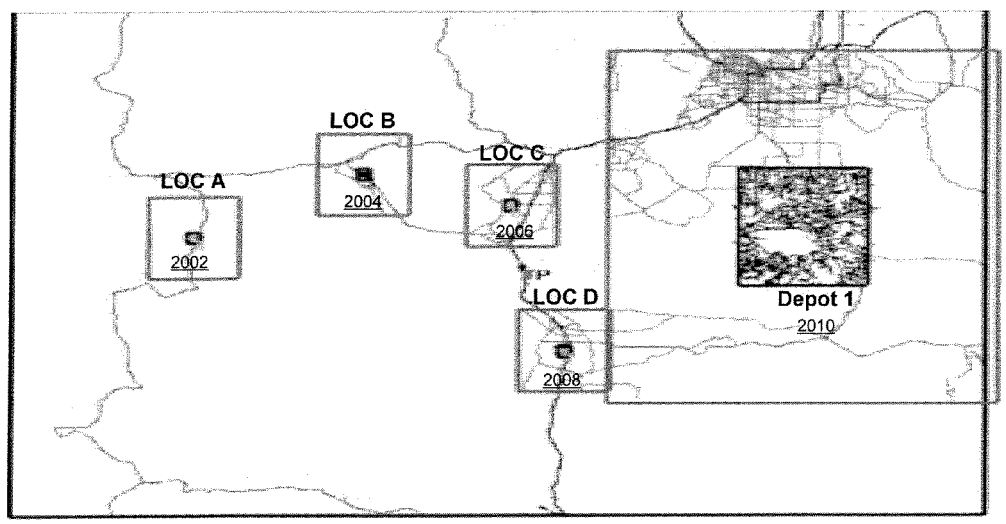
Figure 22:
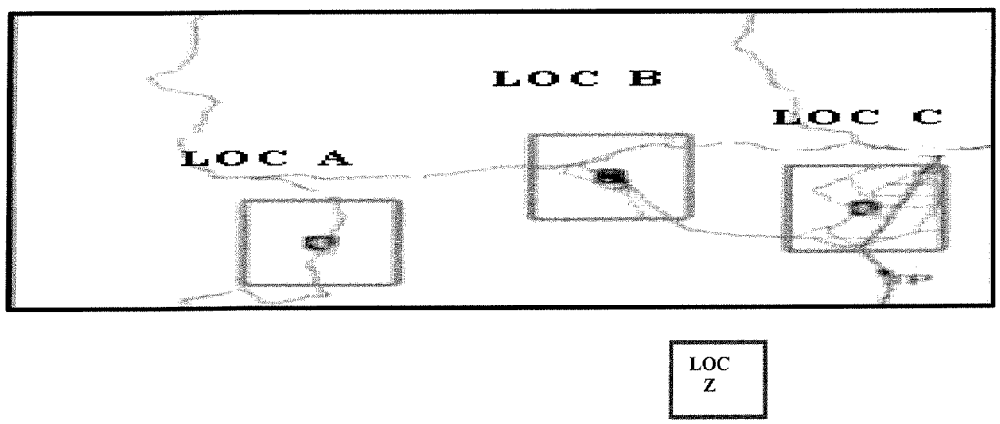
Figure 23:
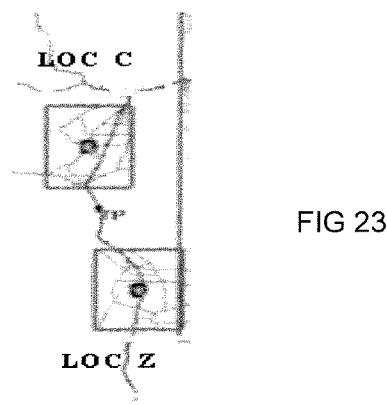

FIG. 17 graphically illustrates the locations included within a particular origin location's friends list;

FIG. 18 is a graphical illustration of the steps performed by the geo-balancing module in a hypothetical case in which the maximum friends parameter is set at 2500;

FIG. 19 is a graphical illustration of an origin location's friend list, including locations that were added through geo-balancing;

FIG. 20 graphically illustrates a travnet according to one embodiment of the invention;

FIG. 21 illustrates an exemplary super matrix created from a hypothetical delivery region containing ten locations;

FIG. 22 graphically illustrates a travnet in which one location (location Z) is excluded from the grid containing locations A, B, and C; and FIG. 23 graphically illustrates a "mini-travnet" created between locations C and Z of FIG. 22.

DETAILED DESCRIPTION OF THE INVENTION

The present invention now will be described with reference to the accompanying drawings, in which some, but not all embodiments of the invention are shown. Indeed, this invention may be embodied in many different forms and should not be construed as limited to the embodiments set forth herein. Rather, these embodiments are provided so that this disclosure will satisfy applicable legal requirements. Like numbers refer to like elements throughout.

As will be appreciated by one skilled in the art, the present invention may be embodied as a method, a data processing system, or a computer program product. Accordingly, the present invention may take the form of an entirely hardware embodiment, an entirely software embodiment, or an embodiment combining software and hardware aspects. Furthermore, the present invention may take the form of a computer program product on a computer-readable storage medium having computer-readable program instructions (e.g., computer software) embodied in the storage medium. More particularly, the present invention may take the form of web-implemented computer software. Any suitable computer-readable storage medium may be utilized including hard disks, CD-ROMs, optical storage devices, or magnetic storage devices.

The present invention is described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks.

The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instructions for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

System Architecture

Figure 1:
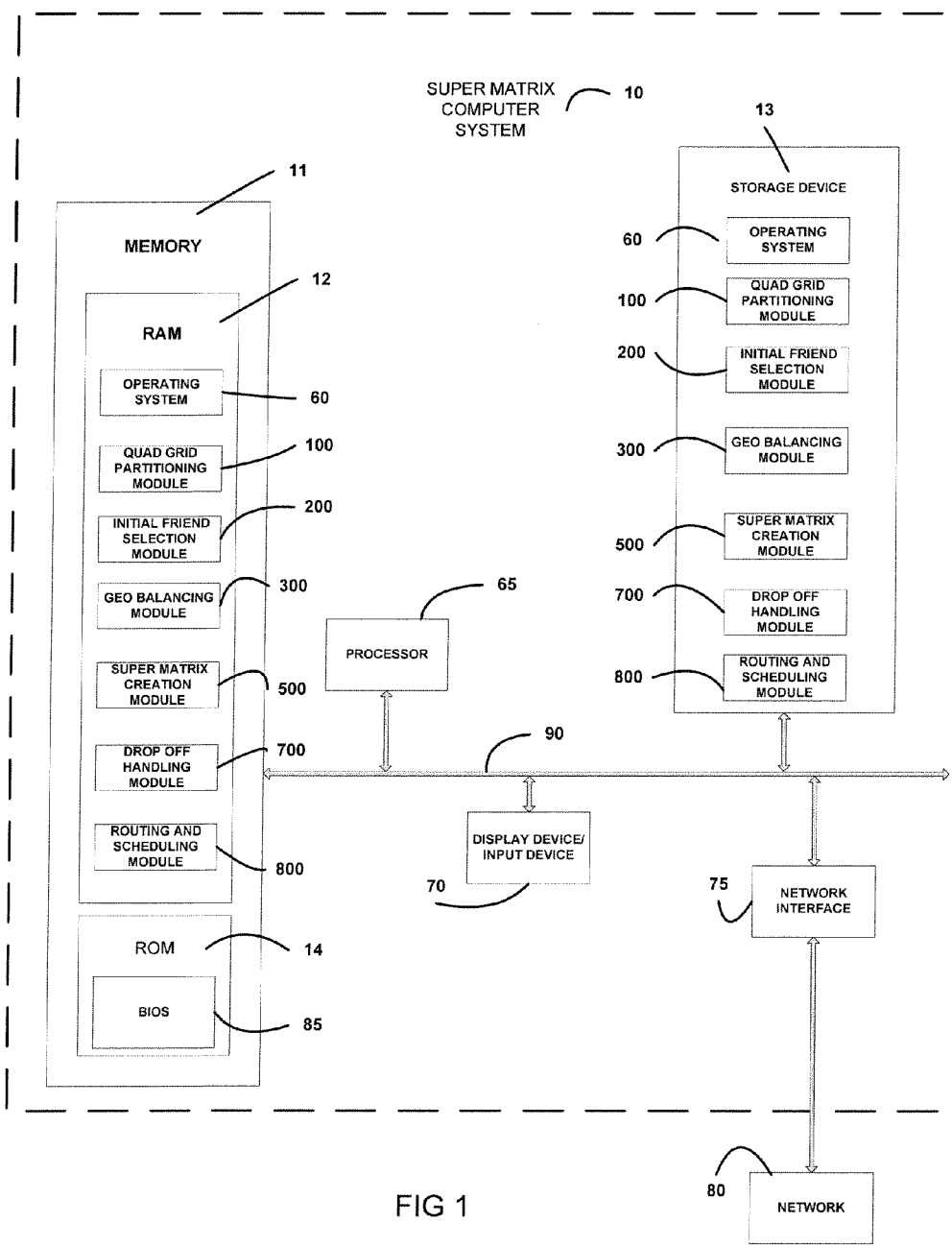
FIG. 1 illustrates a schematic diagram of a super matrix computer system according to one embodiment of the invention.

FIG. 1 illustrates a schematic diagram of a super matrix computer system 10 according to one embodiment of the invention. As may be understood from this figure, in this embodiment, the super matrix computer system 10 includes a processor 65 that communicates with other elements within the super matrix computer system 10 via a system interface or bus 90. Also included in the super matrix computer system 10 is a display device/input device 70 for receiving and displaying data. This display device/input device 70 may be, for example, a touch screen monitor, a keyboard, or any other device known to those skilled in the art. The super matrix computer system 10 further includes memory 11, which preferably includes both read only memory (ROM) 14 and random access memory (RAM) 12. The server's ROM 14 is used to store a basic input/output system 85 (BIOS), containing the basic routines that help to transfer information between elements within the super matrix computer system 10.

In addition, the super matrix computer system 10 includes at least one storage device 13 such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices is connected to the system bus 90 by an appropriate interface. The storage devices and their associated computer-readable media provide nonvolatile storage for a computer such as a personal computer. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 12. Such program modules include an operating system 60, a routing and scheduling module 800, a quad grid partitioning module 100, an initial friend selection module 200, a geo-balancing module 300, a super matrix creation module 500, and a drop-off handling module 700. The routing and scheduling module 800, quad grid partitioning module 100, initial friend selection module 200, geo-balancing module 300, super matrix creation module 500, and drop-off Handling module 700 each control certain aspects of the operation of the super matrix computer system 10, as is described in more detail below, with the assistance of the processor 65 and an operating system 60.

Also located within the super matrix computer system 10 is a network interface 75, for interfacing and communicating with other elements of a computer network 80. Furthermore, one or more of the components may be combined, and additional components performing functions described herein may be included in the super matrix computer system 10.

Exemplary Flow of Super Matrix Computer System

Figure 2:
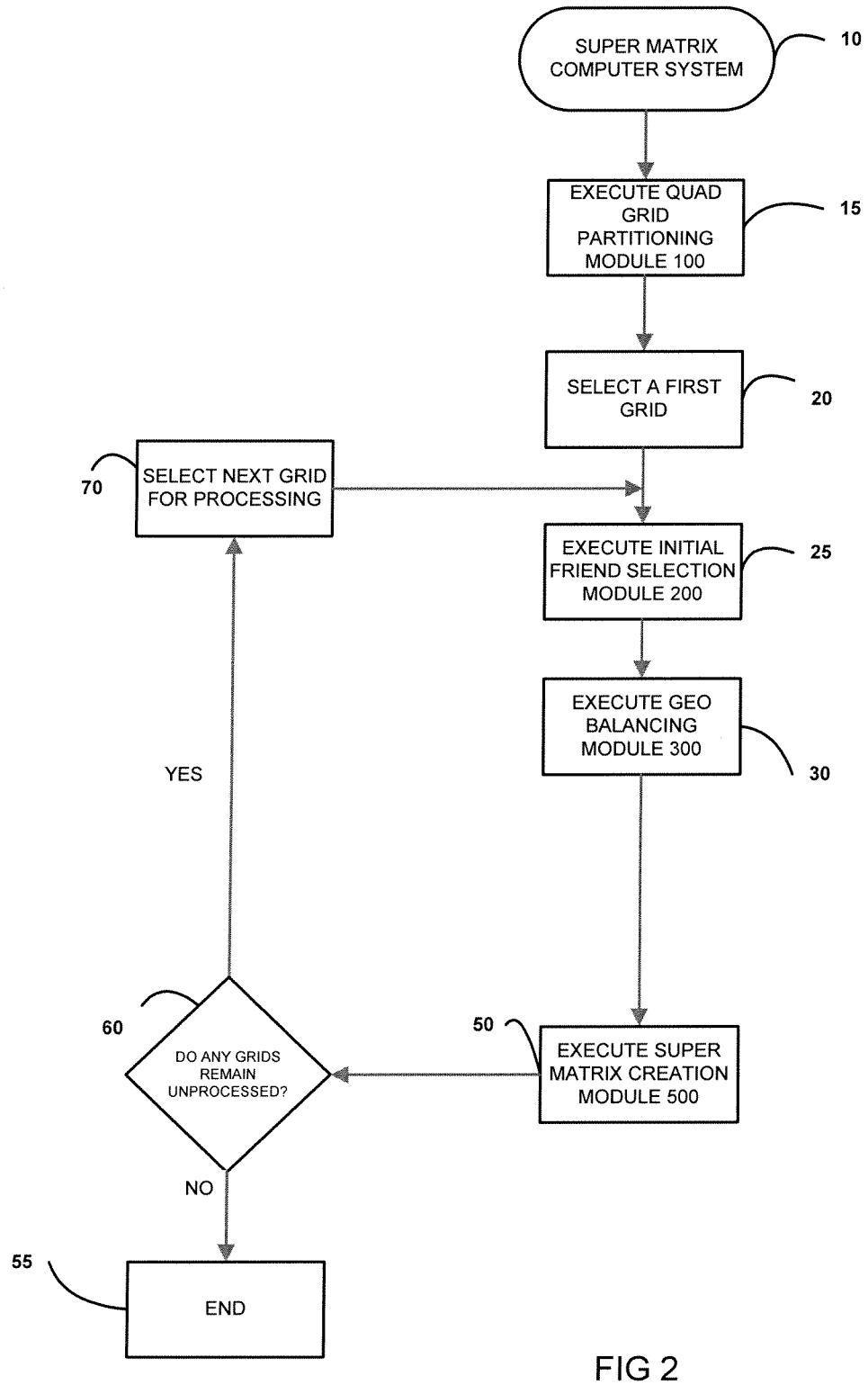
FIG. 2 is a flowchart that illustrates various steps executed by a super matrix computer system according to one embodiment of the present invention.

FIG. 2 depicts the exemplary flow of a super matrix computer system 10 according to one embodiment of the invention. As may be understood from this figure, the system begins at Step 15 by executing the quad grid partitioning module 100. As discussed in greater detail below, the overall function of the quad grid partitioning module 100 according to one embodiment of the invention is to divide the overall delivery region into smaller and more manageable grids. Next, the system proceeds to Step 20 and selects a first grid (created by the quad grid partitioning module 100) for processing. After a grid is selected, the super matrix computer system 10 executes the initial friend selection module 200 at Step 25 and then executes the geo-balancing module 300 at Step 30. In various embodiments of the invention, the execution of the initial friend selection module 200 and geo-balancing module 300 results in the creation of individual friends lists for each location within the selected grid. As used in this application, the term "friends list" is used to define the set of locations that are most likely to appear on the same route as a particular location.

Next, the system proceeds to Step 50 where it executes the super matrix creation module 500. Generally described, in certain embodiments of the invention, the super matrix creation module 500 creates a traversable network ("travnet") for the selected grid, calculates time/distance data from each in-grid location to every node within the travnet, and populates a super matrix containing time/distance data from each in-grid location to that location's friends and in-range depots, which are depositories for items to be delivered to the delivery locations.

Next, the system advances to Step 60, where it determines whether any grids remain unprocessed. If so, the system advances to Step 70 where it selects the next grid for processing. If not, the system advances to Step 55, where it competes processing.

Detailed Discussion of Various System Modules

The various modules referenced in FIG. 2 will now be described in greater detail.

Quad Grid Partitioning Module

Figure 3:
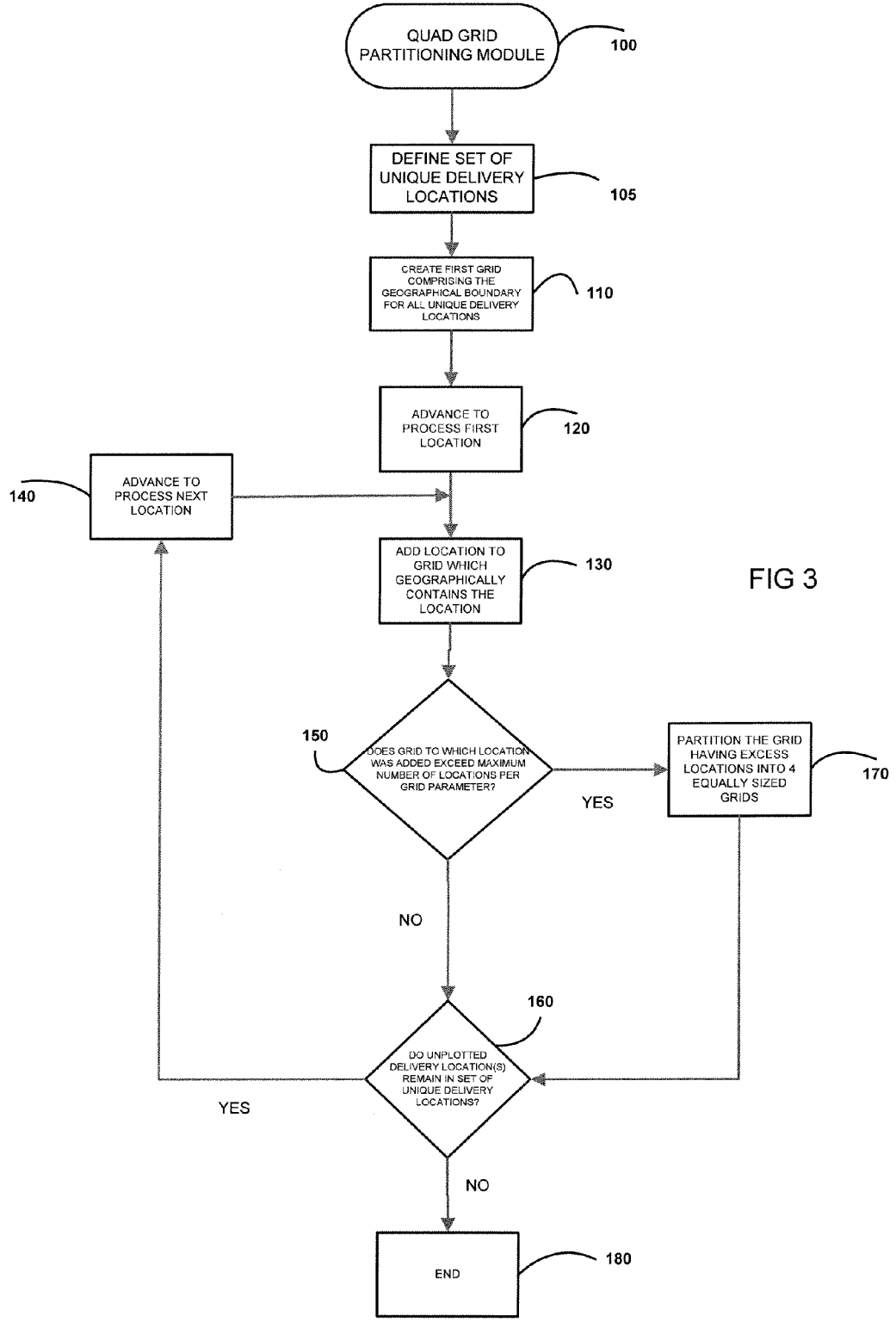
FIG. 3 is a flowchart that illustrates various steps executed by a quad grid partitioning module according to one embodiment of the present invention.

FIG. 3 depicts a quad grid partitioning module 100 according to one embodiment of the invention. As may be understood from this figure, the system begins at Step 105 where a user (e.g., a routing and scheduling technician) defines a set of unique delivery locations within a designated delivery region. For example, for a particular day, the user may be responsible for routing and scheduling one or more delivery vehicles to 100 unique delivery locations (e.g., homes, apartments, or businesses). In this situation, the user would define the set of unique delivery locations at Step 105 to include these 100 unique locations.

After completing Step 105, the system proceeds to Step 110 where it creates a first grid that contains all of the specified unique delivery locations. The initial grid is created by the system such that its geographic boundary encompasses the extent of all of the delivery locations within the delivery region. In another embodiment, the system allows the user to define the first grid's boundaries by presenting a map to the user (e.g., via a computer display screen) and allows the user to select or define the geographical area encompassed by the grid. For example, if all of the unique delivery locations were located in the State of California, the user could potentially set the first grid to include California and portions of surrounding states.

Next, at Step 120, the system selects a first location for processing. At Step 130, the system then adds the selected location to the grid that geographically contains the selected location. In one embodiment of the invention, adding (e.g., "plotting") the location to a grid requires location-specific data relating to the location's longitude and latitude coordinates. For example, for a first location located at 35° Latitude and 119° Longitude, the system would enter 35/119. In one embodiment, after the latitude/longitude data is entered, the system displays (e.g., via a computer display screen) a graphical representation of the selected location. For example, the selected location may be represented by an orange dot or some other symbol such as, for example, a"+.".

After the system plots the first location at Step 130, the system determines (at Step 150) whether the grid to which the location was added exceeds a pre-determined "maximum number of locations per grid" parameter. This "maximum number of locations per grid" parameter is pre-defined within the system. In one embodiment, the "maximum number of locations per grid parameter" is configurable and defined by the user. In other embodiments, the system includes a default value for the maximum number of locations per grid parameter. For example, the default "maximum number of locations per grid" parameter in one embodiment of the invention is 500.

If, at Step 150, the system determines that the "maximum number of locations per grid" parameter is exceeded within any particular grid, the system proceeds to Step 170, where the grid identified as having excess locations is partitioned into four equally sized grids. For example, in an embodiment of the invention where a grid is substantially square shaped, the grid is partitioned into four equally dimensioned grids that are also substantially square shaped. It is to be appreciated that partitioning the grid having excess locations into four equally-sized grids is one embodiment according to the present invention, and in other embodiments, the grid may be partitioned into other numbers of equally-sized grids such as, for example, two. For example, in an embodiment of the invention where a grid is substantially square shaped, the grid is partitioned into four equally dimensioned grids that are also substantially square shaped.

After the grid having excess locations is partitioned at Step 170, the system proceeds to Step 160 and determines whether any unplotted delivery locations remain in the set of unique delivery locations.

Referring back to Step 150, if the system determines that no grids include an excess number of locations, the system proceeds directly to Step 160. If at Step 160, the system determines that no unplotted delivery locations remain, the system proceeds to Step 180, where it completes the quad grid partitioning module 100. However, if additional unplotted delivery locations remain, the system proceeds to Step 140, where it advances to process the next delivery location.

As shown in FIG. 3, in this embodiment, the system performs a continuous loop, in which the system determines whether any particular grid needs to be partitioned after each delivery location is plotted. The system repeats Steps 130, 150, 160, and/or 170 until every delivery location in the set defined at Step 105 has been processed.

Figure 9:
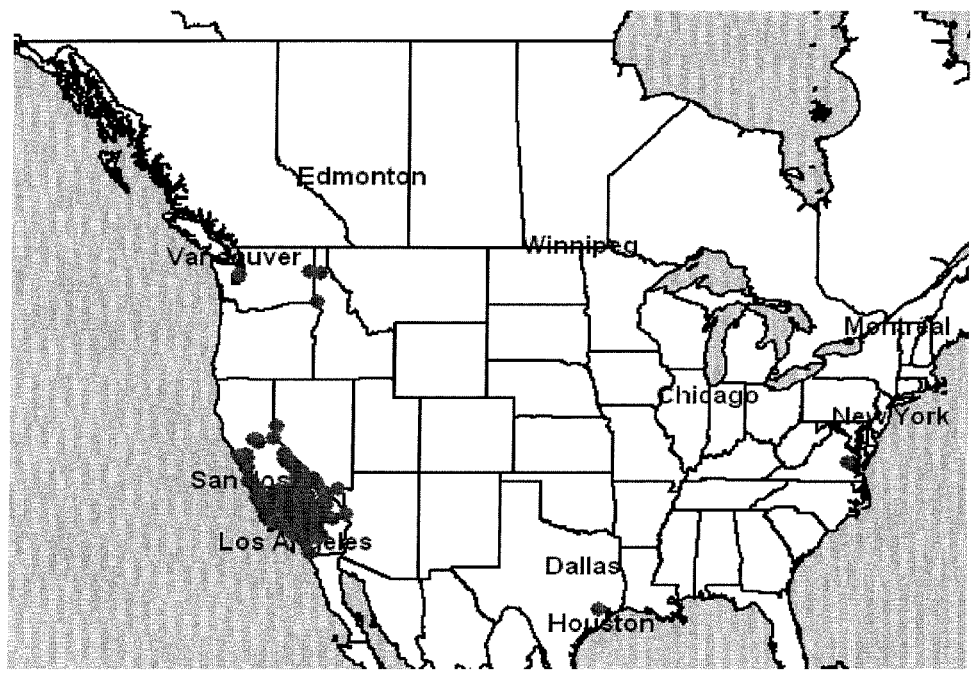
FIG. 9 is a graphical representation of various unique delivery locations located within an exemplary delivery region and displayed by a visual display screen of a super matrix computer system according to one embodiment of the invention.

For illustrative purposes, FIGS. 9-15 graphically illustrate the steps performed by the quad grid partitioning module 100 in various embodiments of the invention. More particularly, FIGS. 9-15 illustrate a hypothetical example in which the system is to route and schedule delivery vehicles to various locations within a pre-determined set of 21,937 unique delivery locations. FIG. 9 shows a graphical representation of the 21,937 unique delivery locations. In this embodiment, the majority of delivery locations are located in the State of California. However, locations are also sporadically located in Washington, Idaho, Virginia, and Texas. In this example, the "maximum number of delivery locations per grid" parameter is set at 500.

Figure 10:
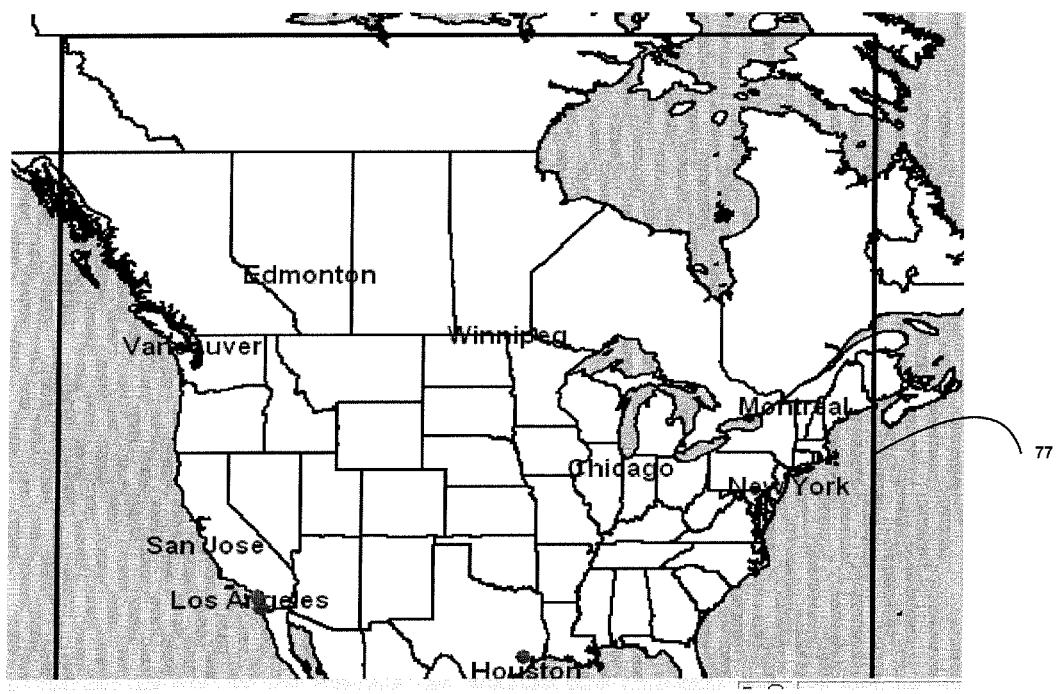
FIG. 10 illustrates the exemplary delivery region of FIG. 9 after 50 locations have been plotted.
Figure 11:
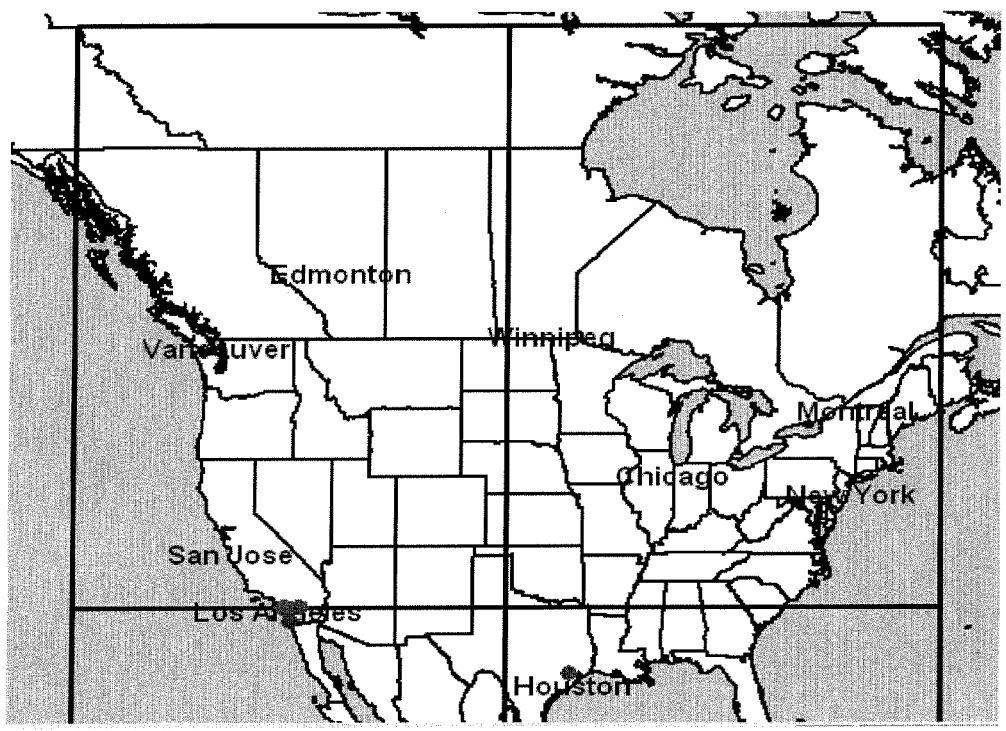
FIG. 11 illustrates the exemplary delivery region of FIG. 9 after 501 locations have been processed.

FIG. 10 illustrates the delivery region after 50 locations have been plotted. (Because FIG. 9 shows the entire delivery region, it is difficult to discern each of the 21,937 individual delivery locations.) As shown in this figure, the entire delivery region is included in a single grid 77. FIG. 11 illustrates the delivery region after 501 locations have been plotted. Because the maximum number of locations per grid was set at 500, the grid is partitioned into four equally-sized grids following the plotting of the 501$^{st}$ location within the initial grid.

Figure 12:
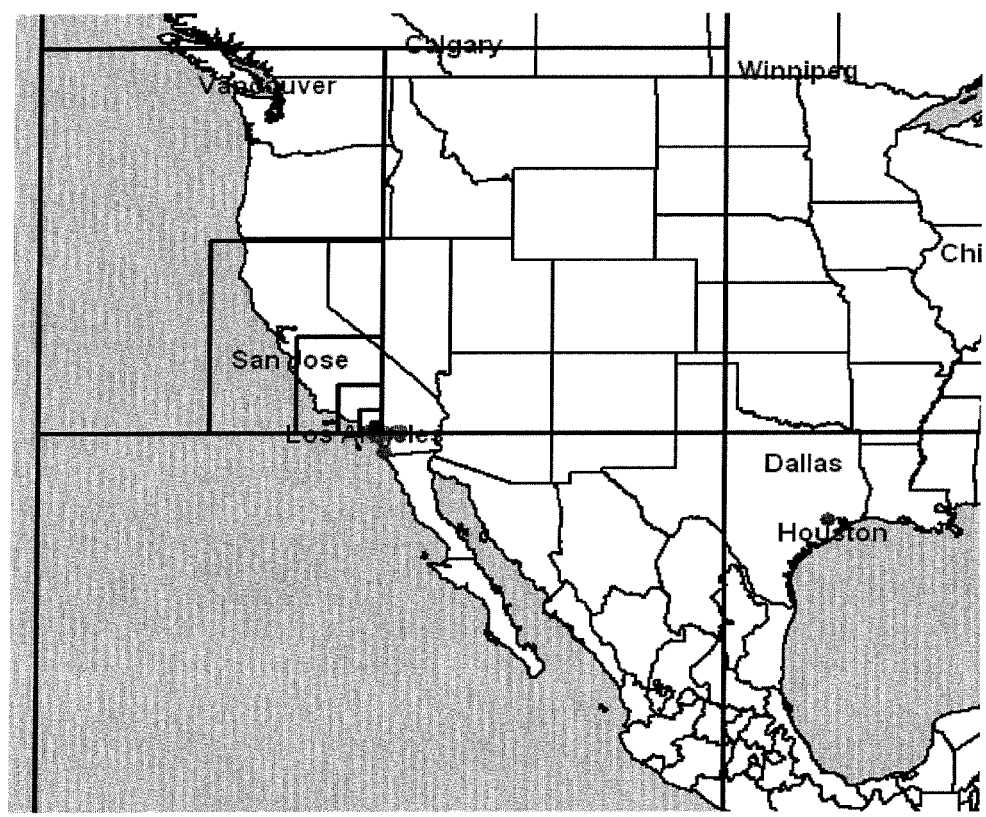
FIG. 12 illustrates the exemplary delivery region of FIG. 9 after 1000 locations have been plotted.
Figure 13:
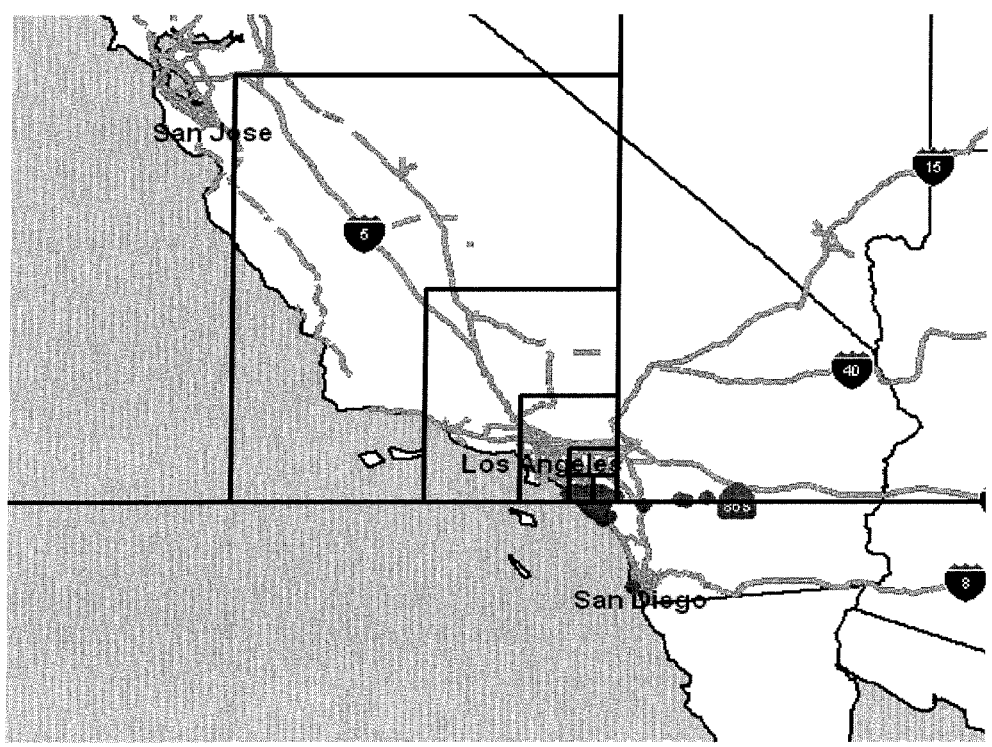
FIG. 13 illustrates a close up view of the exemplary delivery region shown in FIG. 12.
Figure 14:
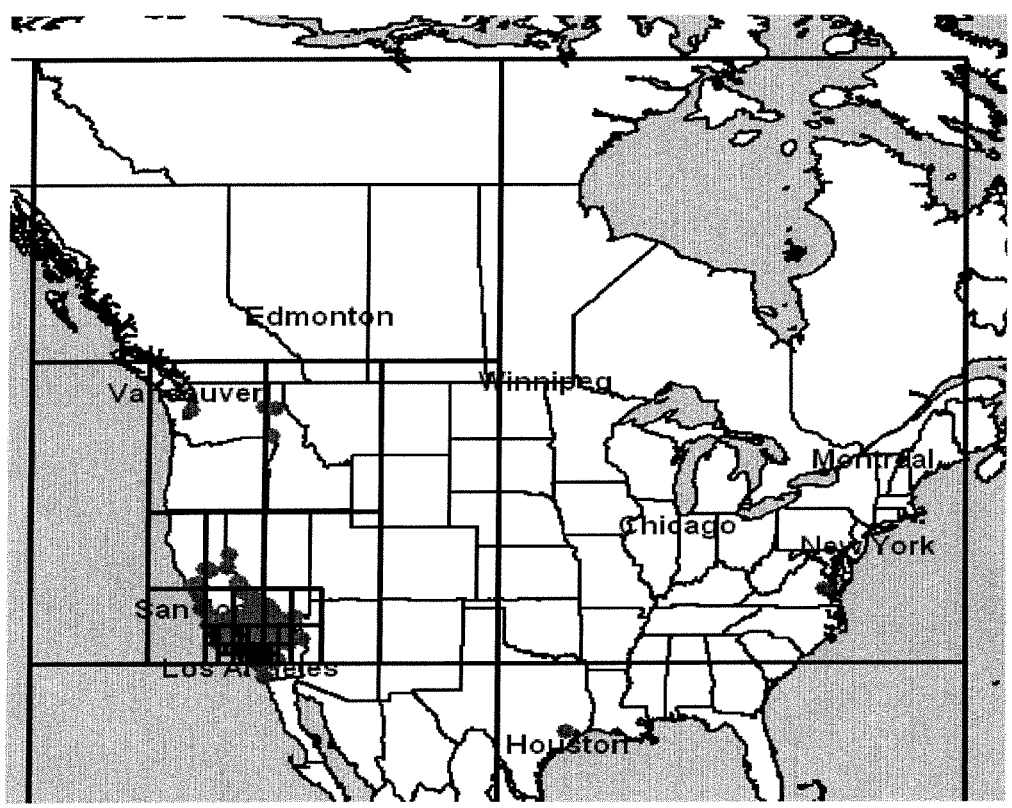
FIG. 14 illustrates the complete quad grid decomposition for the various delivery locations of FIG. 9.
Figure 15:
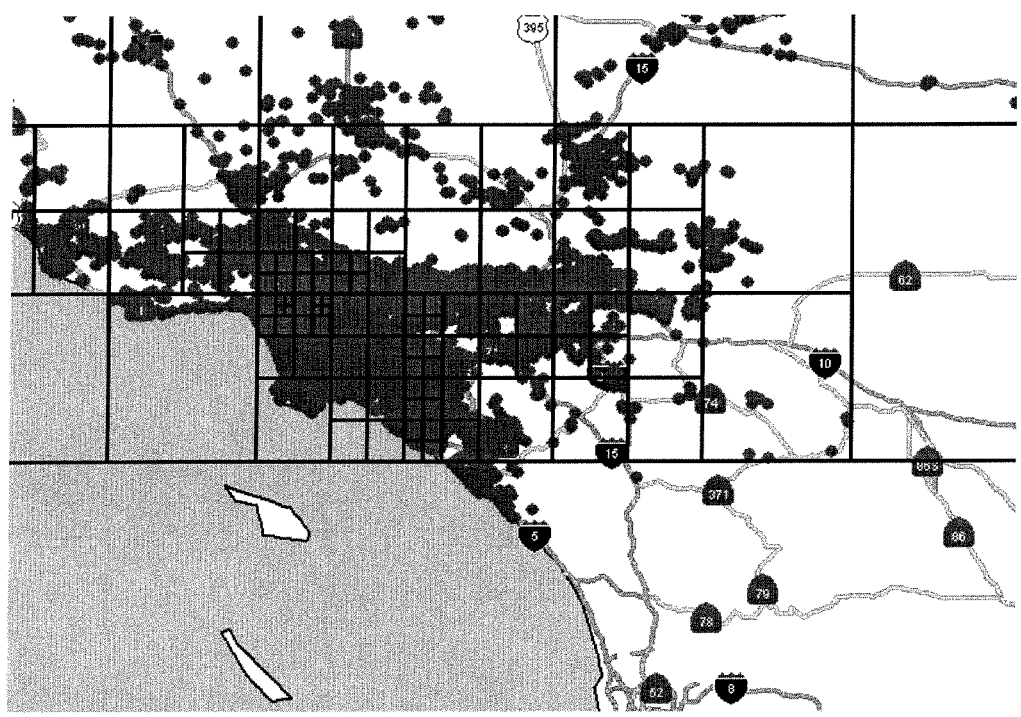
FIG. 15 illustrates the quad grid decomposition of the highest density location grids after all of the various locations have been processed.

FIGS. 12 and 13 illustrate the delivery region after 1000 locations have been plotted. In this example, the highest density location grids are found in the Los Angeles area (See FIG. 13). FIG. 14 shows the complete quad grid decomposition for the 21,937 delivery locations. Finally, FIG. 15 illustrates the quad grid decomposition of the various highest density location grids after all 21,937 locations have been processed.

Figure 16:
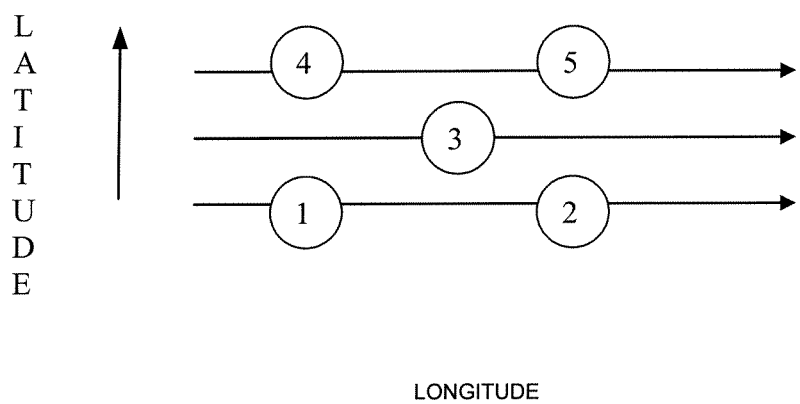
FIG. 16 illustrates one method of determining the order for processing delivery locations.

FIG. 16 illustrates one method of determining the order for processing delivery locations. In this embodiment, the locations are processed (e.g., selected at Steps 120 and 140 and plotted at Step 130) based on their latitude and longitude coordinates. In this example, the set of locations having the smallest latitude value are processed first. The latitude value is determined by taking the absolute value of the location's latitude coordinate. In this embodiment, any set of locations having identical latitude values are processed in order of their respective longitude value, from smallest to largest. Therefore, the first location to be processed will be the location having the combination of the smallest latitude coordinate and the smallest longitude coordinate. FIG. 16 shows a particular example that includes 5 delivery locations. Locations 1 and 2 are processed first because they have the smallest latitude value. As between locations 1 and 2, location 1 is processed first because location 1 has the smallest longitude value. All five locations are processed one at a time according to the rules above until all locations within the set have been plotted.

Initial Friend Selection Module

After the quad grid partitioning module 100 has divided the overall delivery region into smaller and more manageable grids, the next objective of the super matrix computer system 10 is to compile individual friends lists for each unique delivery location. Returning briefly to FIG. 2, the system performs this process on a grid-by-grid basis by selecting a first grid at Step 20 and subsequently selecting one grid after another (Step 70) until every grid has been processed.

Figure 4:
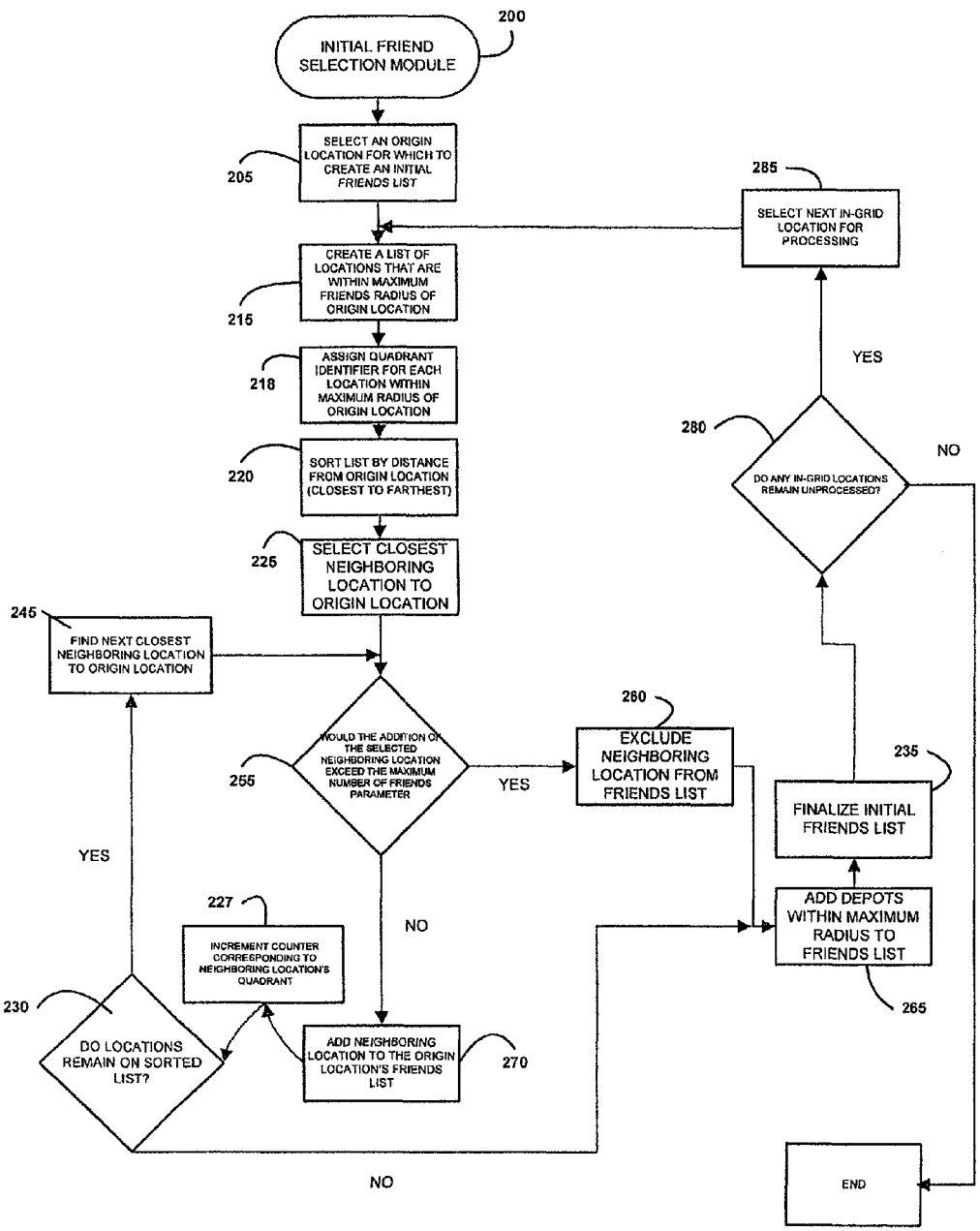
FIG. 4 is a flowchart that illustrates various steps executed by an initial friends selection module according to one embodiment of the present invention.

FIG. 4 depicts an initial friend selection module 200 according to one embodiment of the invention. The initial friend selection module 200 begins at Step 205, where a first in-grid origin location is selected for which to create an initial friends list. Once an origin location is selected at Step 205, the system proceeds to Step 215 where it creates a list of all of the delivery locations that are within a pre-determined "maximum friend radius" of the selected origin location. In one embodiment, the maximum friend radius is a configurable parameter. At Step 218, each location within the maximum friends radius is assigned a quadrant identifier, which may, for example, indicate the general direction a neighboring location is geographically located in relation to the origin location. In one embodiment, the area surrounding the selected origin location is divided into four separate and equal quadrants. As illustrated in FIG. 13, which will be discussed in greater detail below, the four quadrants are formed by two intersecting lines passing horizontally and vertically through the selected origin location. Returning to FIG. 4, at Step 220, the system sorts the list compiled at Step 215 from the closest neighboring location to the selected origin location, to the most distant neighboring location from the selected origin location.

After the list has been sorted at Step 220, the system proceeds to Step 225 where it selects the closest location to be a candidate for addition to the friends list. Once the candidate neighboring location has been selected, the system proceeds to Step 255 where it determines whether the addition of the candidate neighboring location to the origin location's friends list would exceed the "maximum number of friends" parameter. As with the maximum friends radius parameter described above, one embodiment of the invention includes a configurable "maximum number of friends" parameter. If at Step 255, the maximum number of friends would not be exceeded with the addition of the candidate neighboring location, the system proceeds to Step 270 where it adds the neighboring location to the origin location's friends list.

After the neighboring location is added, the system proceeds to Step 227, where it uses the neighboring location's quadrant identifier to increment a counter corresponding to the neighboring location's quadrant. In this embodiment, in which the area surrounding the origin location is divided into four quadrants, four distinct counters are used to track the number of friends. (The tally of the individual counters can be aggregated for purposes of determining whether the maximum number of friends has been exceeded at Step 255. For example, in one embodiment, when the first candidate selected at Step 225 is processed, the counters would total zero neighbors. Assuming the maximum number of friends parameter is set at a number greater than zero, the first candidate will never exceed the maximum.) Next, at Step 227, the counter associated with the added location's quadrant is incremented.

Next, the system advances to Step 230 where it determines whether any locations remain from the sorted list compiled at Step 220. If so, the system proceeds to Step 245 where it selects the next closest location on the sorted list as a candidate for addition to the origin location's friends list. The system then repeats Steps 255, 270, and 227 until either (1) the maximum number of friends parameter has been exceeded, or (2) all locations from the list compiled at Step 215 have been processed.

If the system determines, at Step 255, that the maximum number of friends parameter would be exceeded with the addition of the candidate neighboring location, the system advances to Step 260 where it excludes the neighboring location from the friends list. The system then proceeds to Step 265 and adds all depots within the maximum depot radius of the selected in-grid origin location to the friends list. Next, at Step 235, the system finalizes the initial friends list. When the initial friends list is finalized at Step 235, the system proceeds to Step 280 where it determines whether any in-grid locations remain within the grid selected. If so, the system proceeds to Step 285 and selects a new in-grid location for processing. The system then advances to Step 215 and continues as described above until all in-grid locations have been processed.

FIG. 17 graphically illustrates the locations included within a particular origin location's friends list. In this hypothetical example, the "+" 1700 represents the origin location for which a friends list will be computed. The area bounded within the circle 1702 represents locations that were included within the origin location's friends list following the execution of the initial friend selection module 200 and includes locations added to the origin location's friends list following the execution of the geo-balancing module (discussed in greater detail below). The dots outside the circle 1702 represent delivery locations that are not included within the origin location's friends list.

Geo-Balancing Module

After creating the initial friends list for each in-grid location via the initial friends selection module 200, the system's next objective is to avoid having friends lists that are overloaded with friends located in a highly populated area. For example, if a selected origin location is on the edge or outskirt of a city, a majority of the locations on the initial friends list might be located in the same general direction from the origin location (e.g., toward the city). In other words, the maximum number of friends parameter might be exceeded before locations in rural or sparsely populated areas can be included within the selected origin location's friends list.

Figure 5:
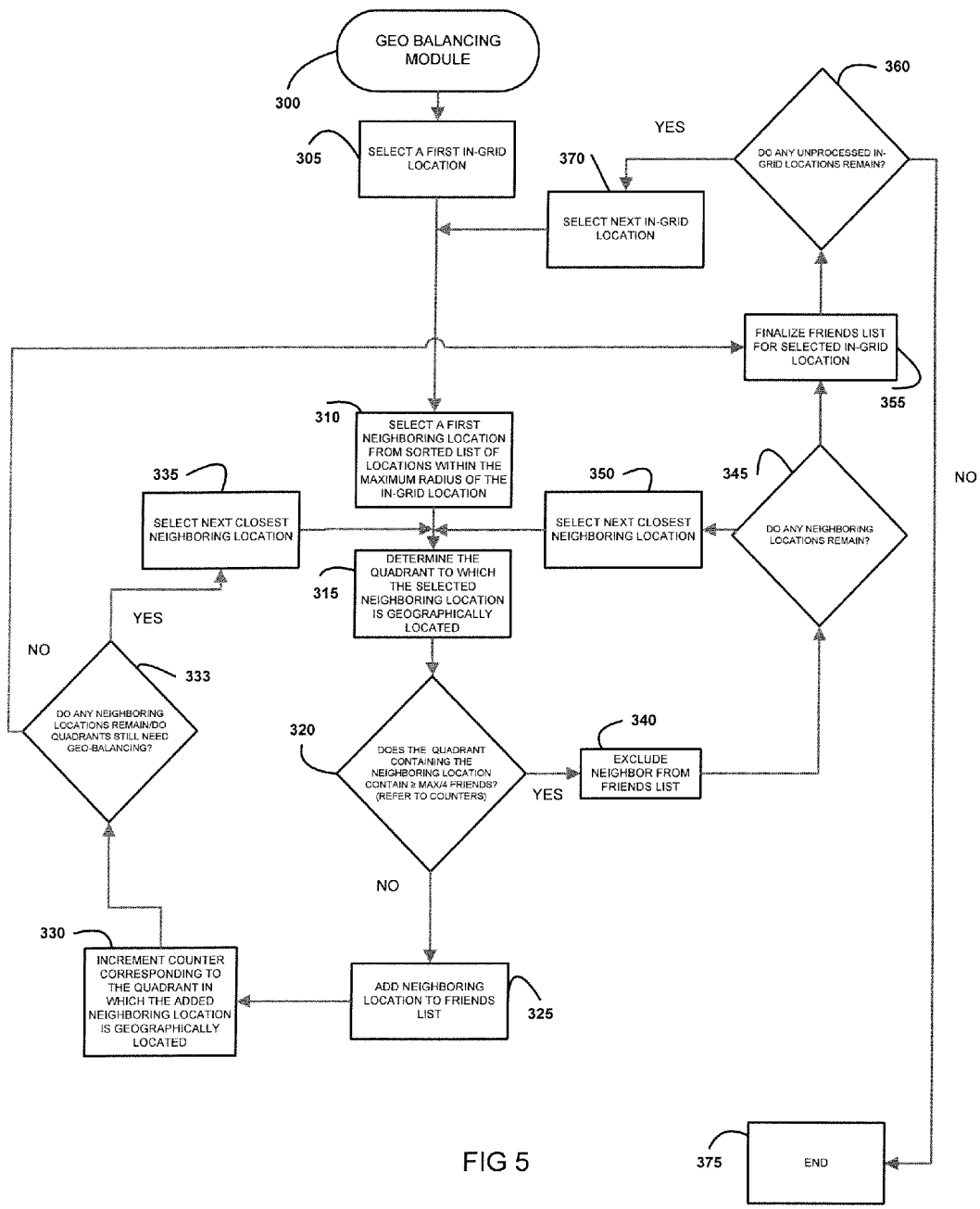
FIG. 5 is a flowchart that illustrates various steps executed by a geo-balancing module according to one embodiment of the present invention.

Referring again to FIG. 2, through the execution of the geo-balancing module 300, the system attempts to include locations from all areas surrounding the origin location within the friends list. As shown in FIG. 5, the geo-balancing module 300 begins at Step 305 with the selection of a first in-grid location. Next, at Step 310, the system selects a first neighboring location from the list that was compiled at Step 215 of the initial friend selection module 200. In one embodiment, the selection at Step 310 is based on the order in which the neighboring locations were sorted at Step 220 of the initial friends selection module 200, (e.g., closest to farthest.) Once a neighboring location has been selected, the system proceeds to Step 315 where it determines the quadrant in which the selected neighboring location is geographically located. In one embodiment, the system uses the quadrant identifiers assigned at Step 218 of the initial friends selection module 200 to determine the selected neighboring location's quadrant location.

Next, at Step 320, the system determines whether the quadrant containing the selected neighboring locations contain greater than or equal to one fourth the maximum number of friends parameter. For example, if the maximum number of friends parameter is set at 400 friends, then the system determines whether the selected quadrant contains 100 (400/4) or more friends. In one embodiment, the counters used to keep track of the maximum number of friends parameter in the initial friends selection module 200 are used to determine whether each quadrant contains greater than or equal to (maximum number of friends parameter)/4 friends, or just "maximum/4" friends. If the selected quadrant contains greater than or equal to maximum/4 friends, the system proceeds to Step 340, where it excludes the neighboring location from the friends list.

Next, at Step 345, the system determines whether the list compiled and sorted at Steps 215 and 220 from the initial friends selection module 200 contains any additional locations. If so, the system proceeds to Step 350, where the next closest neighboring location is selected for processing and the above described steps are repeated.

If at Step 320, the system determines that the quadrant containing the selected neighboring location has less than maximum/4 friends, the system proceeds to Step 325 where it adds the neighboring location to the origin location's friends list. Following the addition of the neighboring location to the friends list, the system advances to Step 330 where it increments the counter corresponding to the quadrant to which the added neighboring location was geographically located. In an embodiment in which the area surrounding the origin location is divided into four discrete quadrants, the system will utilize four different counters to track (or tally) the number of friends within each quadrant. For example, in one embodiment, when a neighboring location geographically located quadrant two is added to the friends list at Step 325, the counter corresponding to quadrant two is incremented by one.

Following Step 330, the system proceeds to Step 333, where it determines whether the list compiled and sorted at Steps 215 and 220 from the initial friends selection module 200 contains additional locations. Also at Step 333, the system determines whether any quadrants still need geo-balancing. If at Step 333, the system determines that either (1) no quadrants need geo-balancing or (2) the list of locations within the maximum radius from the selected origin location is exhausted, the system proceeds to Step 355 where it finalizes the friends list for the selected in-grid location. Otherwise, the system proceeds to Step 335, where it selects the next closest neighboring location within the maximum radius for processing. Once the system has and finalized the friends list for the selected in-grid location at Step 335, the system advances to Step 360, where it determines whether any unprocessed in-grid locations remain. If so, the system proceeds to Step 370 where it selects a new in-grid location for processing. Once all in-grid locations have been processed, the system advances to Step 375, where it completes processing.

As stated above, FIG. 18 is a graphical illustration of the steps performed by the geo-balancing module 300 in a hypothetical case in which the maximum friends parameter is set to 2500. The point 1800 at which the vertical and horizontal lines intersect represents an in-grid location selected at either Step 301 or Step 370. In this example, the two intersecting lines create four equally sized quadrants. The numbers 1500, 700, 200, and 100 represent the number of locations (from the friends list) that are geographically located within each quadrant and within the area encompassed by the inner circle 1802. As such, the northeast quadrant contains 100 locations, the southeast quadrant contains 700 locations, the southwest quadrant contains 1500 locations, and the northwest quadrant contains 200.

As illustrated in FIG. 18, the quadrants containing 1500 and 700 friends dominate the friends list. In fact, 2200 out of the 2500 total friends are located in these two quadrants alone. In one embodiment, the geo-balancing module 300 attempts to balance the northwest and northeast quadrants of FIG. 18 by expanding the arcs 1804, 1806 within these quadrants and adding neighboring locations until each quadrant includes at least one fourth of the maximum friends parameter or until the list of neighboring locations within the maximum radius is exhausted, whichever comes first. In this example, neighboring locations located within the northwest and northeast quadrants will be added until each quadrant contains at least 625 friends. Ultimately, geo-balancing will expand the friends list from 2500 to 3450 locations, with 1500 friend in the southwest quadrant, 700 locations in the southeast quadrant, 625 locations in the northwest quadrant, and 625 locations in the northeast quadrant, assuming that the maximum area limitation (i.e., maximum radius) is not exceeded before 625 locations are found in each of the northwest an northeast quadrants.

FIG. 19 is a graphical illustration of an origin location's friend list, including locations that were added through geo-balancing. In this hypothetical example, the "+" 1900 represents the origin location for which a friends list will be computed. Locations shown within the first bounded area 1902 represent the set of friends determined by either the maximum number of friends parameter or the maximum radius. It is to be appreciated that both, the maximum friends parameter and the maximum radius are configurable parameters and in this hypothetical example of FIG. 19, the maximum friends parameter is set at 2500 and the maximum radius is 250 miles. Locations shown within the second bounded area 1904 represent the set of friends obtained using the geo-balancing module. In FIG. 19, the second bounded area, 1904, represent locations added to the upper left and upper right quadrants of the coordinate system formed with the center at the "plus sign" (the origin location). No locations are added in the lower left and right, because these quadrants are already fully represented in the friends list (initial friends selection). If not for geo-balancing, a super matrix for the origin location 1900 would likely include only times and distances to locations in the highly dense area proximal to the origin location 1900, but not the sparser outlying locations within the second bounded area 1904.

Super Matrix Creation Module

Figure 6:
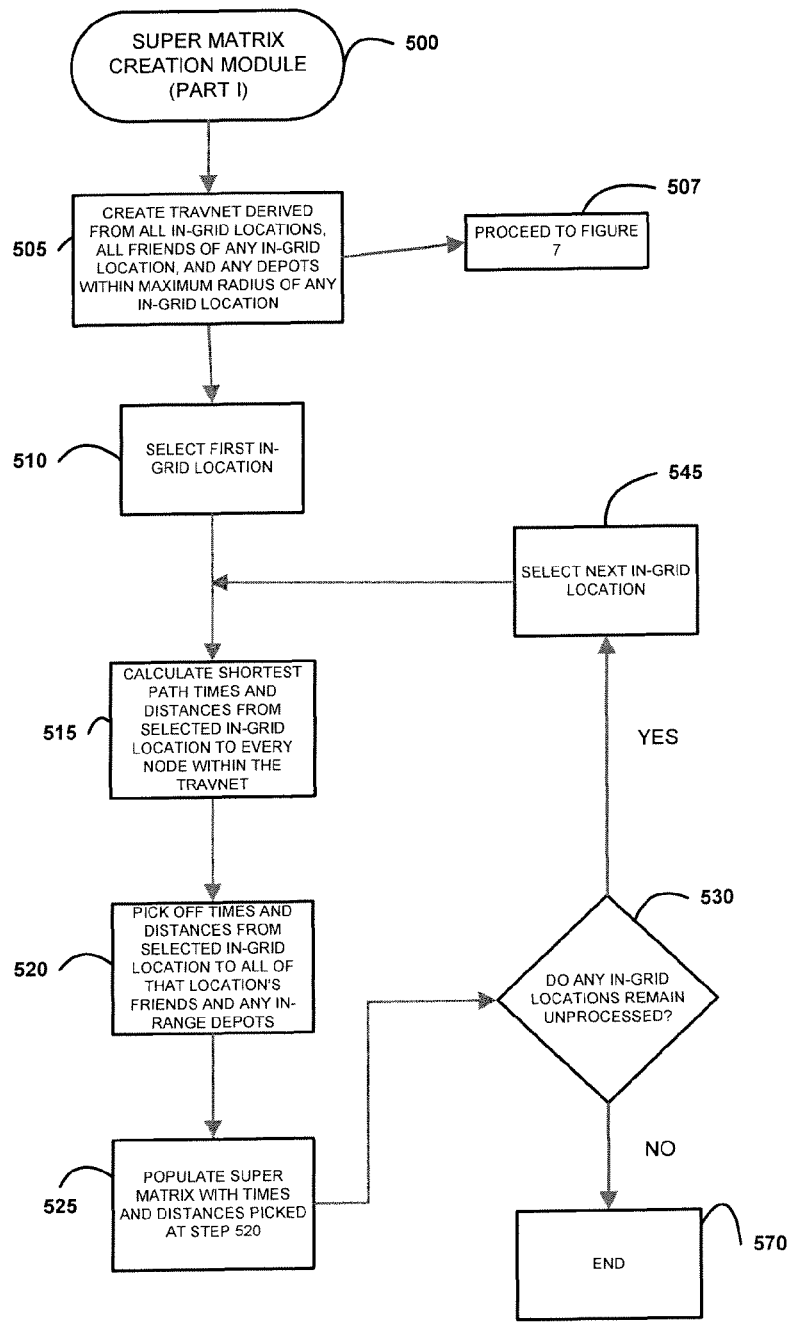
FIG. 6 is a flowchart that illustrates various steps executed by a super matrix creation module according to one embodiment of the present invention.

Referring again to FIG. 2, the super matrix computer system 10 executes the super matrix creation module 500 following the execution of the geo-balancing module 300. As shown in FIG. 6, the super matrix creation module 500 begins at Step 505, with the creation of a travnet derived from (1) all in-grid locations, (2) all friends of any in-grid location, and (3) any in-range depots. In various embodiments, a "travnet" is a set of arcs and nodes. More specifically, in this embodiment, the set of nodes includes a set of "travnet locations" comprising all in-grid locations, all friends of in-grid locations, and all depots within the maximum radius of any in-grid location. The travnet's arcs include all "necessary" street segments that connect the travnet locations listed above. In addition, intersecting street segments connecting travnet locations are also included within the set of nodes. The set of arcs includes a combination of local roads, secondary roads, and interstate/primary roads.

In one embodiment, the total number of street segments (which may be represented by one or more arcs) is reduced via a reduction in the amount of local roads used to connect travnet locations. The reduction of local roads is accomplished by connecting travnet locations using mainly secondary or interstate/primary roads. In this embodiment, local roads are used only to the extent that they connect a travnet location to a secondary road or interstate. By reducing the number of local road (and total street segments) included with the travnet, the total number of arcs and nodes are reduced. Because the processing time required to perform shortest path computation is based principally on the number of arcs and nodes, reducing the number of street segments ultimately reduces the time required to compute the shortest path between travnet locations. A travnet maybe derived from existing map data, available from a variety of third party sources.

FIG. 20 graphically illustrates a travnet according to one embodiment of the invention in which a grid contains three in-grid locations (Loc A 2002, Loc B 2004, and Loc C 2006). Each in-grid location is a friend of the other two in-grid locations as well as location Loc D 2008. In this hypothetical example, the maximum number of friends is set to three. Therefore, location A's 2002 friends list includes B 2004, C 2006, and D 2008; location B's 2004 friends list includes A 2002, C 2006, and D 2008; and location C's 2006 friends list includes locations A 2002, B 2004, and D 2008. Finally, Depot 1 2010 is within the maximum depot radius of A 2002, B 2004, and C 2006. Under this example, the travnet locations include A 2002, B 2004, and C 2006 (the in-grid locations), D 2008 (a friend of an in-grid location) and Depot 1 2010 (a depot within the maximum radius of an in-grid location).

Using these travnet locations, a travnet is derived (using map data known in the art) which comprises connected arcs/nodes of the local roads that surround each travnet location, the arcs/nodes of surrounding secondary roads, and finally, arcs/nodes corresponding to interstate and primary roads.

Returning to FIG. 6, once the travnet for a selected grid has been created, the system advances to Step 510, where it selects a first in-grid location for processing. Next, at Step 515, the system calculates the shortest times and distances from the selected in-grid location to every node within the travnet. As stated above, in various embodiments, the travnet nodes include not only the in-grid locations, friends, and depots, but also street intersections that connect the in-grid locations, friends, and depots. The algorithms used to calculate the shortest times and distances are well known within the art.

Once times and distances from the selected in-grid location to every node has been calculated, the system proceeds to Step 520, where it selectively picks off certain times and distances. The times and distances that are picked off include the time/distances from the selected in-grid location to that location's friends. Next, at Step 525, the times and distances picked off at Step 520 are populated as a row of a super matrix. One embodiment of a super matrix is show in FIG. 21, described in greater detail below.

Once the times and distances from the selected in-grid location to that location's friends are populated into a row of a super matrix, the system advances to Step 530 where it determines whether any in-grid locations remain unprocessed. If so, the system selects a next in-grid location (at Step 545) for processing. As illustrated in FIG. 21, each in-grid location corresponds to a specific row of the super matrix. Rows representing each in-grid location are continually added until all in-grid locations have been processed. Once all in-grid locations have been processed, the system advances to Step 570, where it finishes processing.

Figure 7:
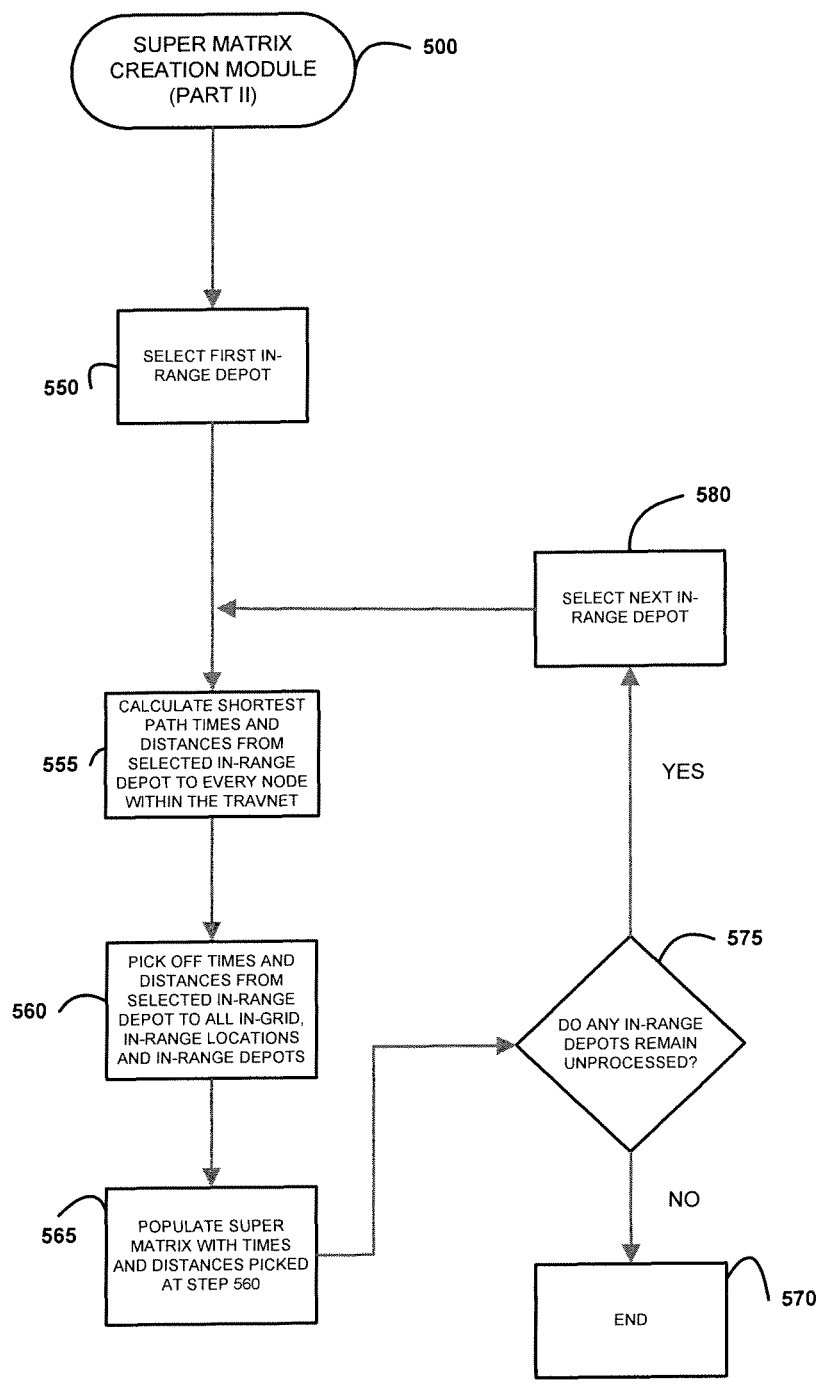
FIG. 7 is a flowchart that illustrates additional steps executed by a super matrix creation module for calculating times/distances from each in-range depot to all in-grid, in-range locations, according to one embodiment of the present invention.

FIG. 7 illustrates additional steps performed by the super matrix creation module 500. In addition to calculating time and distance data between in-grid locations and locations included within friends list, in various embodiments, the super matrix creation module 500 is also designed to process shortest path times and distances from every depot located within a grid's travnet to all other in-grid, in-range locations and in-range depots. Much like the process described in FIG. 6, the system beings at Step 550 by selecting a first in-range depot. Next, at Step 555, the system calculates shortest path computations (using known shortest path algorithms) from the selected depot to every node within the travnet. Following Step 555, the system proceeds to Step 560, where selected data corresponding to the times and distances from the selected depot to all in-grid, in-range locations and in-range depots are populated within the super matrix at Step 565. As shown in FIG. 21, each selected depot is represented by a single row within the super matrix. At Step 575, the system determines if any unprocessed depots (within the travnet) remain. If so, the system selects a next depot (at Step 580) and repeats Steps 555, 560, and 565. Once all depots within the grid's travnet have been processed, the system advances to Step 585, where it completes processing.

As stated above, FIG. 21 illustrates a sample super matrix. The super matrix as shown in FIG. 21 is derived from a group of 9 locations and 1 location/depot. In this hypothetical, the maximum number of friends parameter is set at four. However, as a result of geo-balancing, many locations have more than four friends (e.g., locations 3, 5, 6, 7, 8, and 9). As illustrated by FIG. 21, Row #1 contains times and distances from Location #1 to four different locations. As shown in FIG. 21, each column represents a different location. The location is identified, in this embodiment, using latitude (in millionths of degrees), and longitude (in millionths of degrees) coordinates. Following the latitude and longitude coordinates are time and distance data. In this embodiment, time is shown in seconds and distance in 100ths of a mile. Therefore, referring now Row 1 of FIG. 21, the time/distance from location 1 to the location geographically located at 30180600, −81551600 is 303 seconds (time) and 3 hundredths of a mile (distance). As illustrated in Row 4, location 4 is also a depot and therefore has time/distance data for each in-range location. In this hypothetical, because all nine locations are in-range of the depot, Row 4 has time/distance data to all nine locations.

As illustrated in FIG. 21, in various embodiments, the super matrix does not contain times and distances from each location to every other location. Instead, in such embodiments, the super matrix only contains time and distance data from each in-grid location to that location's friends, including all in-range depots.

Drop-Off Handling Module

In some instances, the algorithms performed within the routing and scheduling algorithm 800 may require time and distance data between two locations that were not included within each other's friends lists. As a result, the super matrix will not contain time and distance data. When such an event occurs, the system may compute time and distance data by executing a drop-off handling module 700.

Figure 8:
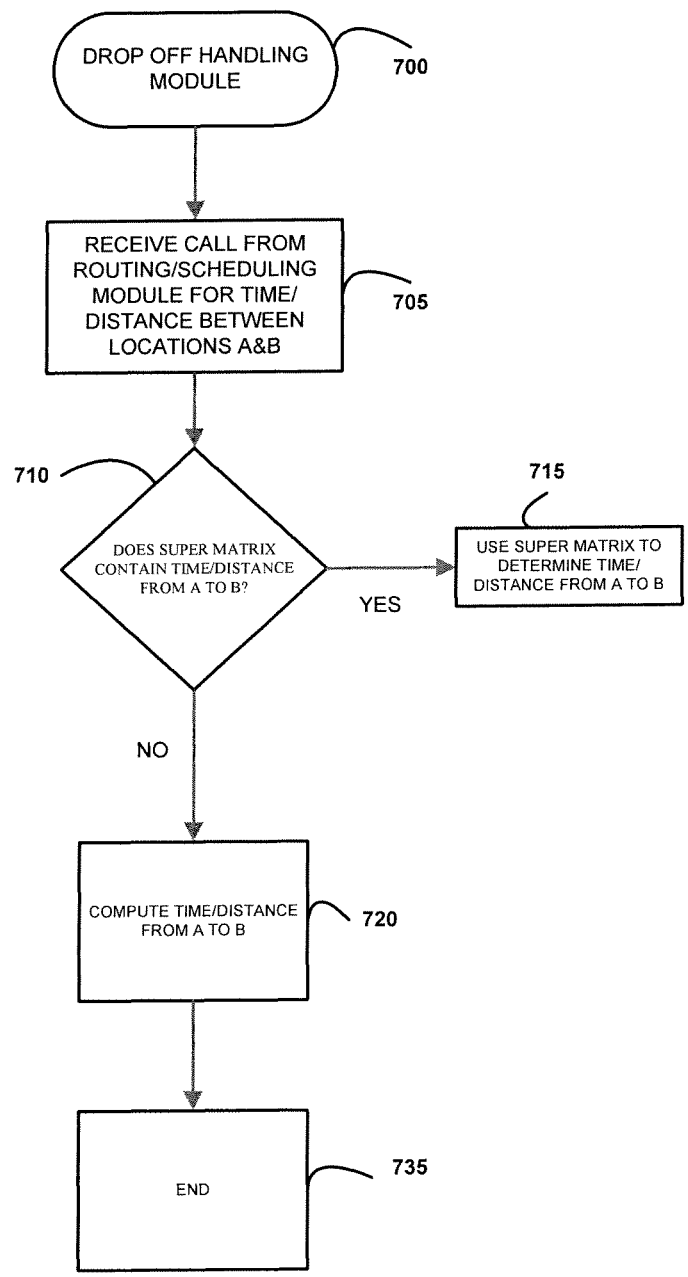
FIG. 8(A) is a flowchart that illustrates various steps executed by a drop off handling module where time and distances are created using XY/Pythagorean theorem calculations, according to one embodiment of the present invention.
FIG. 8(B) is a flowchart that illustrates various steps executed by a drop off handling module where times and distances are compiled through the creation of a "mini-travnet," according to one embodiment of the present invention.
Figure 8:
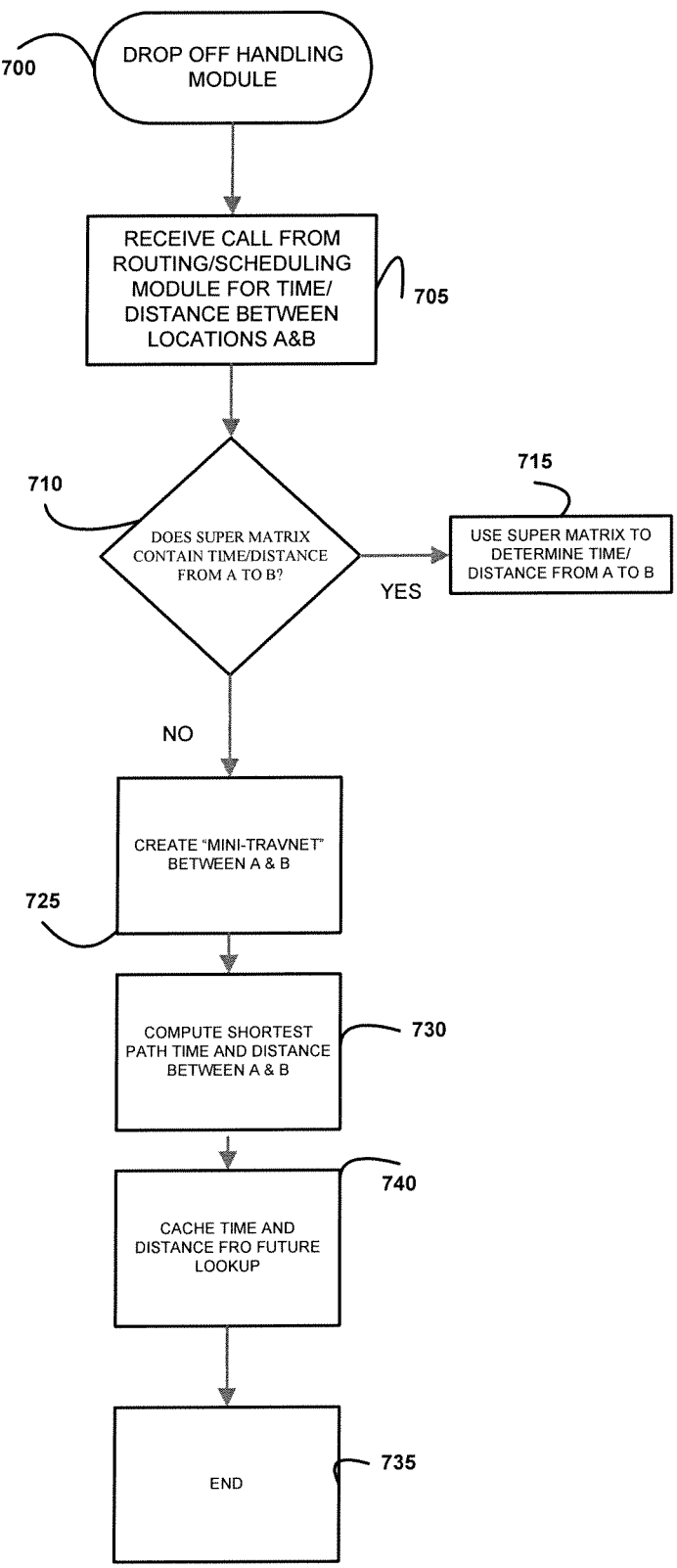

FIGS. 8(A) and 8(B) depict two different drop-off handling modules 700 according to various embodiments of the invention. Referring now to FIG. 8(A), the drop-off handling module 700 begins at Step 705 where the system receives a call from a Routing/Scheduling module 800 requesting time and/or distance data between locations A & B. At Step 710, the system determines whether the super matrix contains time/distance data from A to B. If so, the system advances to Step 715 where it provides the Routing/Scheduling module 800 with data contained in the super matrix. However, if the super matrix does not contain time/distance data from A to B, the system proceeds to Step 720 where it computes the time and distance from A to B using XY distance computation (e.g., using the Pythagorean theorem). Once the time/distance data is determined at Step 720, the system sends the data to the Routing/Scheduling module 800 and advances to Step 735, where the processing ends.

In the embodiment depicted in FIG. 8(B), the drop-off handling module 700 begins by performing the same basic steps shown in FIG. 8(A). For example, at Step 705 the system receives a call from a Routing/Scheduling module 800 requesting time and/or distance data between locations A & B. At Step 710, the system determines whether the super matrix contains time/distance data from A to B. If so, the system advanced to Step 715 where it provides the Routing/Scheduling module 800 with data contained in the super matrix. However, if the super matrix does not contain time/distance data from A to B, the system proceeds to Step 725 where it creates a "mini-travnet" connecting locations A & B. Following the creation of the mini-travnet, the system performs shortest path time and distance calculations between A & B. At Step 740, the time and distance data is saved (e.g., cached) for future lookup.

FIGS. 22 and 23 illustrate a scenario in which the time and distance from one location to another is calculated using the drop-off handling module 700 of FIG. 8(B). This scenario assumes that during the quad grid partitioning module 100, locations A, B, and C were placed in one grid, illustrated in FIG. 22. In addition, the maximum number of friends parameter is set at two. Following the execution of the initial friends selection module 200 and the geo-balancing module 300, locations A, B, and C only include each other as friends. For example, location A's friends are B and C, location B's friends are A and C and location C's friends are A and B. This hypothetical does not include depots. When the travnet for this particular grid is created, it will only include street networks that connect locations A, B, and C. Therefore, the super matrix will not include time and distance data from either A, B, or C to location Z.

Assume that later, after the super matrix has been created, a user creates a route consisting of locations A, B, and C. For this route, regardless of sequence, the super matrix can provide street network times and distances, because the super matrix contains time/distances between any two locations. Now assume that the route sequence is A-B-C, and that the user then decides that they want stop Z to be placed after stop C, making the route A-B-C-Z. However, we now have a situation where the super matrix does not provide a time and distance between C and Z. When such a situation occurs, the drop-off handling module 700 provides real-time time/distance calculations by first creating a "mini-travnet", illustrated in FIG. 23, connecting locations C and Z. From this "mini-travnet," the system computes the shortest path time and distance between C and Z. (This time and distance is then cached so that the "mini-travnet" does not have to be recreated and times/distances recomputed, in the event the system needs the time/distance between C and Z again during the same routing session).

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for delivering items to a set of delivery locations within a delivery region, the system comprising one or more memory storage areas and one or more processors, the system configured to:
    partition, using the one or more processors, a delivery region into multiple rectangular geographic areas, wherein each of the geographic areas includes one or more delivery locations;
    select a delivery location in a first geographic area of the multiple rectangular geographic areas, the selected delivery location being associated with a first list comprising closest delivery locations from the selected delivery location, at least some of said closest delivery locations being located in a second geographic area distinct from the first geographic area;
        partition the delivery region into four discrete partitions in response to a size of the first list exceeding a maximum list size;
        calculate, using the one or more processors, a preferred partition population size by dividing, using the one or more processors, the maximum list size by four;
    geobalance the first list, wherein geobalancing includes at least one of:
        removing, from the first list, a delivery location located in a partition with a size greater than the preferred partition population size, and
        adding, to the first list, a delivery location located in a partition with a size less than the preferred partition population size; create, using the one or more processors, a traversable network,
    wherein the traversable network comprises a set of nodes and arcs,
    wherein said set of nodes comprises the set of delivery locations including the delivery locations within the first geographic area and the delivery locations included within the geobalanced first list, said geobalanced first list containing at least one delivery location not contained in the first geographic area;
    calculate shortest path information for the set of delivery locations from each of the delivery locations geographically located within the first geographic area to every node contained within the traversable network for future lookup by a routing and scheduling system; and route a delivery vehicle using the shortest path information to each of the delivery locations, the system further comprising:
    the delivery vehicle that obtains one or more items for delivery from a depot and transports, using the route, the one or more items for delivery to each delivery location.

2. The system of claim 1, wherein the traversable network includes at least one node that corresponds to the depot.

3. The system of claim 1, wherein said predetermined maximum list size is 2500.

4. The system of claim 1, wherein said system is further configured to:
    generate the first list, said generating including the steps of:
        select the delivery locations located within a predetermined distance from the selected delivery location;
        organize the delivery locations based on distance to the selected delivery location;
        wherein the first list is geobalanced based at least on the distance of the delivery locations in the first list to the selected delivery location.

5. The system of claim 1, wherein said system is further configured to:
    route the at least one delivery vehicle to a delivery location not in the set of delivery locations by calculating shortest path information from one of the delivery locations in the set of delivery locations to the delivery location.

6. A method for delivering items to a set of delivery locations within a delivery region comprising the steps of:
    (A) selecting, via one or more processors, a first rectangular geographic area;
    (B) selecting a delivery location in the first rectangular geographic area, the selected delivery location being associated with a list that includes closest delivery locations located within a predetermined distance from the selected delivery location, at least some of said closest delivery locations being located in a second geographic area, said second geographic area surrounding the selected delivery location and including one or more rectangular geographic areas not contained in the first rectangular geographic area;
    (C) dividing the first geographic area and the second geographic area into four geographic partitions in response to a population of the list exceeding a maximum list size;
    (D) calculating a preferred partition population size by dividing the maximum list size by four;

(E) geobalancing the list, said geobalancing includes:
  1) removing, from the list, a location located in a partition with a size greater than the preferred partition population size, and
  2) adding, to the list, a location located in a partition with a size less than the preferred partition population size;
(F) repeating steps (B) through (E) for each delivery location geographically located within the first geographic area;
(G) creating a traversable network, wherein the traversable network comprises a set of nodes and arcs, the nodes comprising the set of delivery locations including the delivery locations within the first rectangular geographic area and the delivery locations included within the geobalanced list for all delivery locations contained in the first rectangular geographic area, the geobalanced list containing at least one delivery location not contained in the first rectangular geographic area;
(H) calculating, via the one or more processors, shortest path information from the delivery locations geographically located within the first geographic area to every node contained within the traversable network; and
(I) selecting, via the one or more processors, particular shortest path information for the set of the selected delivery locations and storing the selected particular shortest path information for future lookup by a routing and scheduling system;
(J) routing a delivery vehicle using the shortest path information to each of the delivery locations;
(K) obtaining one or more items for delivery from a depot; and
(L) transporting, by the delivery vehicle using the route, the one or more items for delivery to each delivery location.

7. The system of claim 6, wherein the traversable network includes at least one node that corresponds to the depot.

8. The method of claim 6, wherein
said method further comprising the steps of:
  generating the list, said generating including the steps of:
    selecting all delivery locations located within a predetermined distance from the selected delivery location;
  organizing the delivery locations based on distance to the selected delivery location;
  wherein the list is geobalanced at step (E) based at least on the distance of the delivery locations in the list to the selected delivery location.

9. The method of claim 6, further comprising:
routing the at least one delivery vehicle to a delivery location not in the set of delivery locations by calculating shortest path information from one of the delivery locations of the set of delivery locations to the delivery location.

* * * * *